US010941840B2

(12) United States Patent
Yao et al.

(10) Patent No.: US 10,941,840 B2
(45) Date of Patent: Mar. 9, 2021

(54) CONTINUOUSLY VARIABLE TRANSMISSION WITH WEDGE ACTUATION MECHANISM

(71) Applicant: GM GLOBAL TECHNOLOGY OPERATIONS LLC, Detroit, MI (US)

(72) Inventors: Jian Yao, Shanghai (CN); Chengwu Duan, Shanghai (CN); Chunhao J. Lee, Troy, MI (US); Derek F. Lahr, Howell, MI (US); Farzad Samie, Franklin, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 487 days.

(21) Appl. No.: 15/829,259

(22) Filed: Dec. 1, 2017

(65) Prior Publication Data

US 2018/0080529 A1   Mar. 22, 2018

Related U.S. Application Data

(63) Continuation-in-part of application No. 15/183,948, filed on Jun. 16, 2016, now Pat. No. 10,267,391.

(51) Int. Cl.
| | |
|---|---|
| *F16H 9/18* | (2006.01) |
| *F16H 61/662* | (2006.01) |
| *F15B 15/12* | (2006.01) |
| *F16H 57/04* | (2010.01) |
| *F16H 63/06* | (2006.01) |

(Continued)

(52) U.S. Cl.
CPC ............. *F16H 9/18* (2013.01); *F15B 15/125* (2013.01); *F16H 9/26* (2013.01); *F16H 57/0489* (2013.01); *F16H 57/12* (2013.01); *F16H 61/662* (2013.01); *F16H 61/66227* (2013.01); *F16H 61/66259* (2013.01); *F16H 63/062* (2013.01); *F16H 63/065* (2013.01); *B60Y 2300/18016* (2013.01);

(Continued)

(58) Field of Classification Search
CPC . F16H 9/18; F16H 9/26; F16H 7/1218; F16H 61/662; F16H 55/56; F16H 57/0489; F16H 57/12; F15B 15/12
See application file for complete search history.

(56) References Cited

U.S. PATENT DOCUMENTS

| | | |
|---|---|---|
| 977,781 A | 12/1910 | Clapp |
| 4,515,041 A | 5/1985 | Frank et al. |

(Continued)

FOREIGN PATENT DOCUMENTS

EP         1048879 A2    11/2000

*Primary Examiner* — Michael R Mansen
*Assistant Examiner* — Robert T Reese
(74) *Attorney, Agent, or Firm* — Quinn IP Law

(57) ABSTRACT

A powertrain has a continuously variable transmission including a shaft rotatable about an axis. The CVT further comprises a variator assembly that includes a pulley supported on the shaft. The pulley has a movable sheave with a ramp surface. The movable sheave is axially movable on the shaft. The variator assembly also includes an endless rotatable device frictionally engaged with the movable sheave. An actuator mechanism includes a wedge component supported on the shaft. The wedge component has a wedge surface that automatically engages the ramp surface when torque on the shaft is in a first direction. The wedge surface applies a wedge force on the ramp surface. The actuator mechanism further includes an actuator that is operatively connected to the movable sheave and is activatable to apply a force on the movable sheave.

19 Claims, 13 Drawing Sheets

(51) Int. Cl.
- *F16H 57/12* (2006.01)
- *F16H 9/26* (2006.01)
- *F16H 61/664* (2006.01)
- *F16H 55/56* (2006.01)

(52) U.S. Cl.
CPC .......... *F16H 55/56* (2013.01); *F16H 61/6648* (2013.01); *F16H 2312/14* (2013.01)

(56) References Cited

U.S. PATENT DOCUMENTS

| | | |
|---|---|---|
| 4,735,598 A | 4/1988 | Moroto et al. |
| 5,157,992 A | 10/1992 | Hayashi et al. |
| 5,184,981 A | 2/1993 | Wittke |
| 5,540,048 A | 7/1996 | Larkin et al. |
| 6,387,000 B1 | 5/2002 | Eisenbacher et al. |
| 6,413,178 B1 | 7/2002 | Chamberland |
| 6,669,588 B2 | 12/2003 | Schmid |
| 7,207,920 B2 | 4/2007 | Jonsson et al. |
| 7,637,836 B2 | 12/2009 | Watanabe et al. |
| 7,670,243 B2 | 3/2010 | Miller |
| 7,686,715 B2 | 3/2010 | Carlson et al. |
| 7,988,573 B2 | 8/2011 | Shioiri et al. |
| 8,858,389 B2 | 10/2014 | Lundberg et al. |
| 9,261,187 B1 | 2/2016 | Otanez |
| 9,777,810 B2 | 10/2017 | Kawakami et al. |
| 10,054,202 B2 | 8/2018 | Yokoyama |
| 10,267,391 B2 | 4/2019 | Yao et al. |
| 2002/0063000 A1 | 5/2002 | Kojima |
| 2005/0090367 A1 | 4/2005 | Jonsson et al. |
| 2005/0233842 A1 | 10/2005 | Shioiri et al. |
| 2006/0009321 A1 | 1/2006 | Carlson et al. |
| 2010/0081526 A1 | 4/2010 | Kossack |
| 2010/0113201 A1 | 5/2010 | Lannutti |
| 2013/0116073 A1 | 5/2013 | Liebel et al. |
| 2013/0196815 A1 | 8/2013 | Lundberg et al. |
| 2015/0167802 A1 | 6/2015 | Yoshida et al. |
| 2016/0131230 A1 | 5/2016 | Kawakami et al. |
| 2016/0281847 A1 | 9/2016 | Kanayama |
| 2017/0363184 A1 | 12/2017 | Yao et al. |
| 2018/0080529 A1 | 3/2018 | Yao et al. |
| 2019/0170231 A1 | 6/2019 | Duan et al. |
| 2019/0170249 A1 | 6/2019 | Huang et al. |

CONTINUOUSLY VARIABLE TRANSMISSION WITH WEDGE ACTUATION MECHANISM

CROSS-REFERENCE TO RELATED APPLICATION

This application is continuation-in-part of and claims the benefit or priority to U.S. patent application Ser. No. 15/183,948 filed Jun. 16, 2016 which is incorporated herein by reference in its entirety.

TECHNICAL FIELD

The present teachings generally include a continuously variable transmission.

BACKGROUND

Continuously variable transmissions vary a groove width of an input pulley and a groove width of an output pulley to vary the speed ratio of an input shaft to an output shaft. The groove width is typically varied by a hydraulic actuator that moves an axially-movable sheave of the pulley.

SUMMARY

In a hybrid powertrain, engine torque may vary such as during engine braking, when an electric machine, such as a generator or a motor/generator, operatively connected to the crankshaft is controlled to function as a generator placing a torque load opposite to the drive load on the crankshaft. In such operating conditions, the wedge force may decrease, and the wedge surface may separate from the ramp surface. A controllable actuating mechanism provides a requisite axial force under such operating conditions to achieve, together with the axial component of the wedge force, the required clamping force in order to maintain or achieve a desired transmission ratio.

More specifically, a powertrain is disclosed that includes a continuously variable transmission (CVT) that has an actuation mechanism utilizing the mechanical advantage of a wedge. The terms "actuation mechanism" and "actuator mechanism" are used interchangeably herein. The powertrain includes a continuously variable transmission including a shaft rotatable about an axis. For example, the shaft may be an input shaft and the axis may be an input axis of the CVT. The CVT further includes a variator assembly that has a pulley supported on the shaft. The pulley has a movable sheave with a ramp surface. The movable sheave is axially movable on the shaft. The variator assembly also includes an endless rotatable device frictionally engaged with the movable sheave. An actuator mechanism includes a wedge component supported on the shaft. The wedge component has a wedge surface that automatically engages the ramp surface when torque on the shaft is in a first direction. The first direction may be the direction of drive torque of an engine included in the hybrid powertrain. The wedge surface applies a wedge force on the ramp surface. The actuator mechanism further includes an actuator that is operatively connected to the movable sheave and is configured to apply a force on the movable sheave.

For example, the wedge force of the wedge component and the force of the linear actuator together contribute to the clamping force of the endless rotatable device on the moveable sheave. Accordingly, under operating conditions when the wedge force needs to be supplemented in order to achieve a desired clamping force or in order to change a ratio of the CVT, the linear actuator is controlled to provide a desired force.

In an aspect of the disclosure, the wedge surface and the ramp surface are configured so that the ratio of the wedge force to the clamping force is dependent on an angle of incline of the wedge surface relative to the axis of rotation of the shaft.

The CVT may include both an input wedge component on an input axis of the CVT and an output wedge component on an output axis of the CVT. The CVT may include an input actuator of an input actuator mechanism, and an output actuator of an output actuator mechanism which are independently controllable to respectively control force provided on a movable sheave of an input pulley of the CVT, and force on a movable sheave of an output pulley of the CVT.

In an aspect of the present disclosure, the shaft is an input shaft, the axis is an input axis, the pulley is an input pulley, the wedge component is an input wedge component, and the actuator mechanism is an input actuator mechanism. The continuously variable transmission further includes an output shaft rotatable about an output axis. The variator assembly further includes an output pulley rotatably supported by the output shaft. The endless rotatable device is frictionally engaged with the output pulley. An output actuator mechanism includes an output wedge component supported on the output shaft. The output wedge component has a wedge surface that automatically engages with the ramp surface of the output pulley when torque on the output shaft is in the first direction with the wedge surface of the output wedge component applying a wedge force on the ramp surface of the output pulley. The output actuator mechanism also includes an output linear actuator that is operatively connected to the movable sheave of the output pulley and may be activated to apply a force on the movable sheave of the output pulley. The wedge force of the output wedge component and the force of the output linear actuator together contribute to the clamping force of the endless rotatable device on the movable sheave of the output pulley. The input linear actuator and the output linear actuator may be activated independently of one another.

The actuator(s) discussed herein may be rotary actuators or may be linear actuators and may be activated via electric power and/or hydraulic power in various embodiments. For example, in an aspect of the present disclosure, the actuator is a linear actuator and the force applied by the linear actuator is an axial force along the input axis or the output axis. The linear actuator includes an electric motor, a linearly movable screw operatively connected to the movable sheave, and a gearing mechanism operatively connecting the electric motor to the linearly movable screw. The actuator mechanism further includes an electronic controller operatively connectable to the electric motor and responsive to powertrain operating conditions. The electronic controller is configured to activate the electric motor in response to the powertrain operating conditions to move the linearly movable screw to apply the axial force on the movable sheave.

In an aspect of the disclosure, the shaft is an input shaft, and the powertrain further includes an engine coupled to the input shaft and driving the input shaft with torque in the first direction. The force applied by the actuator is at least partially in response to the torque provided by the engine.

In an aspect of the disclosure, an electric machine is operatively connected to the engine and is controllable to function as a generator using torque provided by the engine. The force provided by the actuator is varied in response to the torque provided by the engine to the generator.

In an aspect of the disclosure, the actuator mechanism further includes an electric pump, a hydraulic system, and an electronic controller operatively connected to the hydraulic system. The actuator is configured to be activated via fluid in the hydraulic system that is pressurized by the electric pump. Due to the automatic wedge force, the electric pump may be of a smaller capacity than is typically used in a hybrid or non-hybrid powertrain. For example, in an aspect of the disclosure, the electric pump has a capacity of less than or equal to 10 bar. Because the electric pump is not engine-driven, it is available for use under all operating conditions.

In an aspect of the disclosure, the actuator mechanism further includes a mechanical pump configured to be driven by the engine, an accumulator pressurizable with fluid by the mechanical pump, and an electronic controller operatively connected to the hydraulic system and to the engine. The actuator is activated by fluid in the hydraulic system that is pressurized by the mechanical pump when the engine is running, and is activated by fluid in the hydraulic system that is released from the accumulator when the engine is not running during a hybrid start-stop mode. Due to the automatic wedge force, the mechanical pump may be of a smaller capacity than is typically used for hydraulic actuation or lubrication in a hybrid or non-hybrid powertrain. For example, the mechanical pump may have a capacity of less than or equal to 20 bar. The fluid actuator maintains a reserve of pressurized fluid that supplements line pressure when the mechanical pump is not running.

In an aspect of the disclosure, the actuator mechanism further includes a mechanical pump driven by the engine, and also an electric pump. The actuator mechanism includes a hydraulic system, and an electronic controller operatively connected to the hydraulic system and to the engine. The actuator is activated by fluid in the hydraulic system pressurized by the mechanical pump when the engine is running in a first set of operating conditions. The actuator is activated by fluid in the hydraulic system pressurized by the electric pump both during a second set of operating conditions requiring greater fluid pressure than the first set of operating conditions, and when the engine is not running during a hybrid start-stop mode. For example, the second set of operating conditions may be vehicle maneuvers that require a relatively high hydraulic fluid pressure, such as a vehicle wide open throttle launch, or a "tip in" acceleration by the vehicle operator of the accelerator input (such as a gas pedal), and thereby a need to combine the capability of both pumps to generate high pressure.

Within the scope of the present disclosure, a powertrain includes a CVT that has an input shaft rotatable about an input axis and an output shaft rotatable about an output axis. The CVT also includes a variator assembly including an input pulley supported on the input shaft and an output pulley supported on the output shaft, each of the input pulley and the output pulley having an axially movable sheave with a ramp surface. The variator assembly further includes an endless rotatable device frictionally engaged with the input pulley and with the output pulley. The CVT includes an actuator mechanism that includes an input wedge component supported on the input shaft and an output wedge component supported on the output shaft, each of the input wedge component and the output wedge component having a wedge surface that automatically engages the ramp surface of the respective input pulley and output pulley when torque on the input shaft is in a drive direction and a load reaction torque is on the output shaft, with the wedge surface applying an axial wedge force on the ramp surface. The actuator mechanism also includes an input linear actuator that is operatively connected to the movable sheave of the input pulley and may be activated to apply an axial force on the movable sheave of the input pulley, and an output linear actuator to apply an axial force on the movable sheave of the output pulley. The CVT includes an electronic controller operable to control the input linear actuator and the output linear actuator independently of one another.

In an aspect of the disclosure, the axial wedge force of the input wedge component and the axial force of the input linear actuator together create a clamping force of the endless rotatable device on the movable sheave of the input pulley. The axial wedge force of the output wedge component and the axial force of the output linear actuator together create to a clamping force of the endless rotatable device on the movable sheave of the output pulley.

In an aspect of the disclosure, the actuator mechanism is electrically powered and is characterized by an absence of hydraulic actuation.

In an aspect of the disclosure, each of the input linear actuator and the output linear actuator includes an electric motor, a linearly movable screw operatively connected to the movable sheave, and a gearing mechanism operatively connecting the electric motor to the linearly movable screw. The actuation system also includes an electronic controller operatively connected to the electric motor and responsive to powertrain operating conditions. The electric motor is configured to be activated by the electronic controller in response to the powertrain operating conditions to move the linearly movable screw to apply the axial force on the respective movable sheave.

In an aspect of the disclosure, the powertrain may further comprise an engine coupled to the input shaft and configured to drive the input shaft with torque in the drive direction. The axial force applied by the input linear actuator is at least partially in response to the torque provided by the engine.

In an aspect of the disclosure, the actuator mechanism may further comprise a hydraulic system, an electric pump, and an electronic controller operatively connected to the hydraulic system. The input linear actuator and the output linear actuator are configured to be activated independently of one another via fluid in the hydraulic system that is pressurized by the electric pump.

In an aspect of the disclosure, the actuator mechanism further includes a hydraulic system, a mechanical pump driven by the engine, an accumulator pressurizable with fluid by the mechanical pump, and an electronic controller operatively connected to the hydraulic system and to the engine. The input linear actuator and the output linear actuator are configured to be activated independently of one another by fluid in the hydraulic system that is pressurized by the mechanical pump when the engine is running. The input linear actuator and the output linear actuator are configured to be activated by fluid in the hydraulic system that is released from the accumulator when the engine is not running during a hybrid start-stop mode.

The above features and advantages and other features and advantages of the present teachings are readily apparent from the following detailed description of the best modes for carrying out the present teachings when taken in connection with the accompanying drawings.

DETAILED DESCRIPTION

Figure 1:
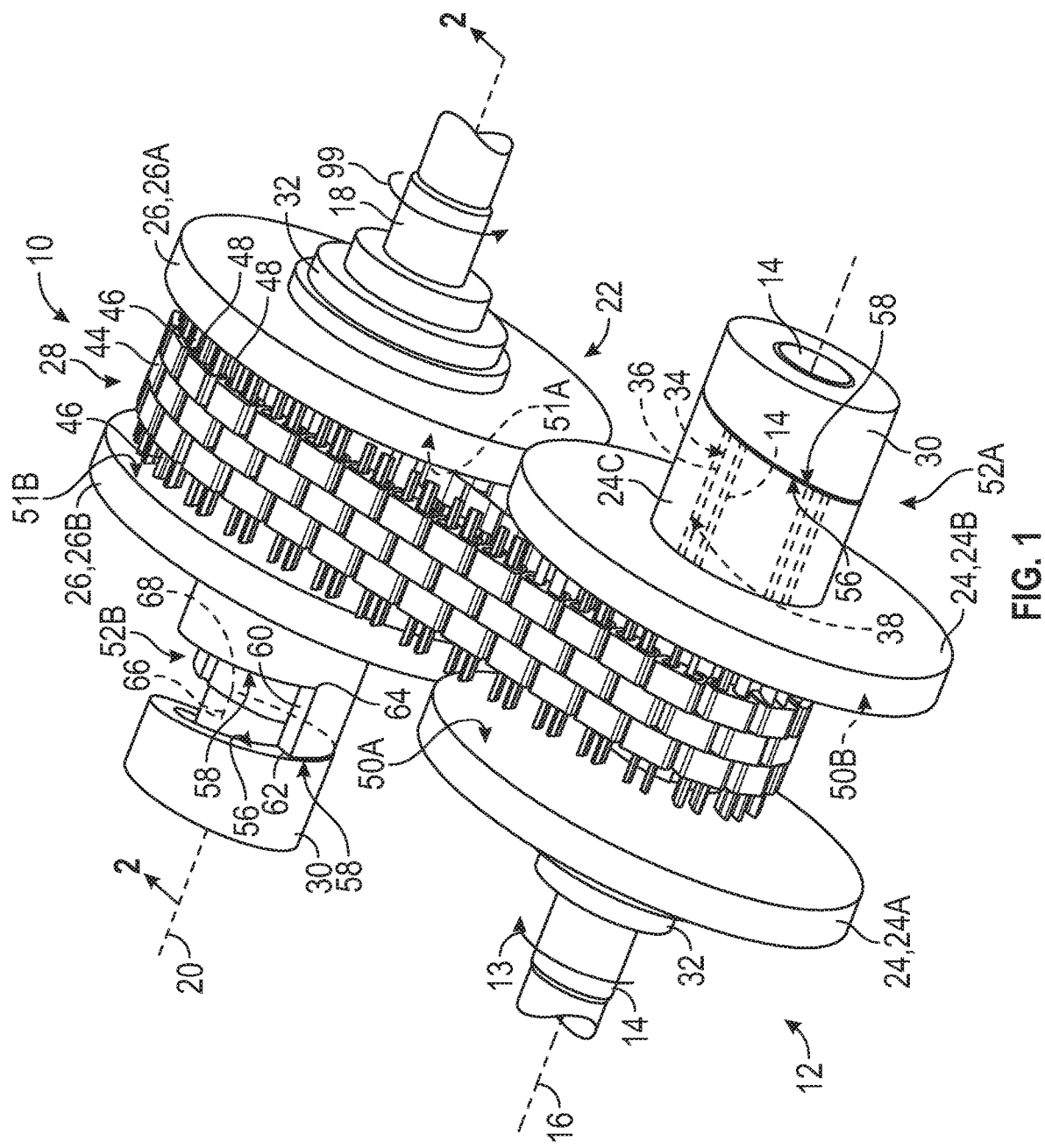
FIG. 1 is a schematic perspective illustration in partial fragmentary view of a first embodiment of a continuously variable transmission (CVT) with wedge actuators.

Referring to the drawings, wherein like components are referred to with like reference numbers, FIG. 1 shows a continuously variable transmission (CVT) 10 for a powertrain 12 of a mobile platform, such as a vehicle powertrain. The mobile platform, including by way of non-limiting examples, may be a passenger vehicle, a light-duty or heavy-duty truck, a utility vehicle, an agricultural vehicle, an industrial/warehouse vehicle, a recreational off-road vehicle, a robotic device, or an aeronautic device. The CVT 10 includes an input shaft 14 rotatable about an input axis 16, and an output shaft 18 rotatable about an output axis 20. The output axis 20 is also referred to herein as a first axis of rotation, and the input axis 16 is referred to herein as a second axis of rotation. The input axis 16 and the output axis 20 are generally parallel with one another. The powertrain 12 includes a power source (not shown) such as an engine that is operatively connected to drive the input shaft 14. The power source provides a driving torque 13 on the input shaft 14. The powertrain 12 may also include a load, such as the weight of the vehicle, (also referred to as a torque load 99 which is opposite to the direction of the driving torque 13), at vehicle wheels (not shown) which load acts on the output shaft 18. The input shaft 14 may be referred to as a drive shaft and the output shaft 18 may be referred to as a driven shaft.

The CVT 10 includes a variator assembly 22 that enables a controlled, continuously variable speed ratio between the input shaft 14 and the output shaft 18, and serves to transfer torque from the input shaft 14 to the output shaft 18. The variator assembly 22 includes an input pulley 24, an output pulley 26, and an endless rotatable device 28. The input pulley 24 is rotatably supported by the input shaft 14. Stated differently, the input pulley 24 is supported on the input shaft 14 and can rotate about the input axis 16. The input pulley 24 generally rotates about the input axis 16 with the input shaft 14, but is not fixed for common rotation with the input shaft 14 and can be controlled to have some rotation relative to the input shaft 14 as described herein.

As best shown in FIG. 1, the input pulley 24 includes an axially-fixed sheave 24A and an axially-movable sheave 24B. The axially-fixed sheave 24A is positioned between an axially-fixed wedge component 30, described herein, and an axially-fixed thrust bearing 32, also described herein, and thus is substantially constrained from axial movement relative to the input shaft 14 (i.e., in a direction along the input axis). The axially-movable sheave 24B is splined to an outer surface 34 of a shaft 36 of the axially-fixed sheave 24A at an inner surface 38 of the axially-movable sheave 24B, as best shown with respect to the similar components of the output pulley 26 shown and described with respect to FIG. 2. The shaft 36 of the axially-fixed sheave 24A radially surrounds the input shaft 14, extending through the endless rotatable device 28 and through an inner diameter of a shaft 24C of the axially-movable sheave 24B. Both the axially-movable sheave 24B and the axially-fixed sheave 24A can be controlled to rotate in unison (i.e., together at the same speed) slightly relative to the input shaft 14 while the axially-movable sheave 24B moves axially along the input axis 16 to control a speed ratio of the input shaft 14 to the output shaft 18 and to control a clamping force of the endless rotatable device 28 on the input pulley 24, using the mechanical advantage of a wedge as described herein.

Figure 2:
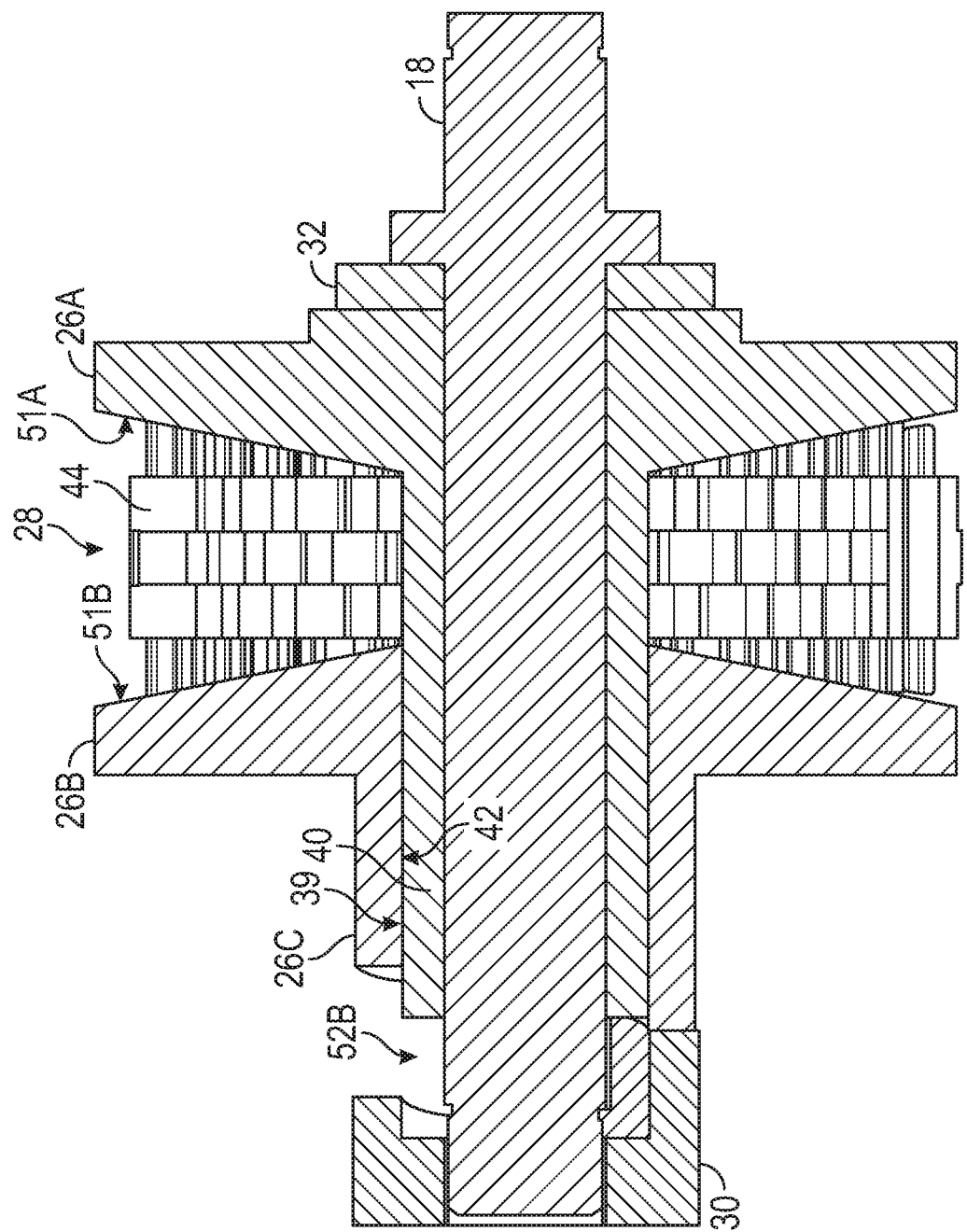
FIG. 2 is a schematic cross-sectional illustration of the CVT of FIG. 1 taken at lines 2-2 in FIG. 1

The output pulley 26 is rotatably supported by the output shaft 18. Stated differently, the output pulley 26 is supported on the output shaft 18 and can rotate about the output axis 20. The output pulley 26 generally rotates about the output axis 20 with the output shaft 18, but is not fixed for common rotation with the output shaft 18 and can be controlled to have some rotation relative to the output shaft 18 as described herein. As best shown in FIG. 2, the output pulley 26 includes an axially-fixed sheave 26A and an axially-movable sheave 26B. The axially-fixed sheave 26A is positioned between an axially-fixed wedge component 30, described herein, and an axially-fixed thrust bearing 32, also described herein, and thus is substantially constrained from axial movement relative to the output shaft 18 (i.e., in a direction along the output axis 20). The axially-fixed wedge component 30 and the axially-fixed thrust bearing 32 are identical to those disposed on the input shaft 14. Similar to the axially-movable sheave 24B of the input pulley 24, the axially-movable sheave 26B is splined to an outer surface 39 of a shaft 40 of the axially-fixed sheave 26A at an inner surface 42 of the axially-movable sheave 26B. The axially-movable sheave 26B includes a pulley shaft 26C that is splined to and extends along the shaft 40 of the axially-fixed sheave 26A. Both the axially-movable sheave 26B and the axially-fixed sheave 26A can be controlled to rotate in unison (i.e., together at the same speed) slightly relative to the output shaft 18.

The endless rotatable device 28 is frictionally engaged with the input pulley 24 and with the output pulley 26. As shown, the endless rotatable device 28 includes a chain 44 that carries pins 46 in openings 48 extending through links of the chain 44. The pins 46 frictionally engage with facing frustoconical surfaces 50A, 50B, 51A, 51B of the sheaves 24A, 24B, 26A, 26B of the respective pulleys 24, 26. The frustoconical surfaces 50A, 50B define a groove of the input pulley 24, and the frustoconical surfaces 51A, 51B define a groove of the output pulley 26. Alternatively, the endless rotatable device 28 could be a belt having overlapping steel bands held by blocks having angled surfaces that interface with the pulleys 24, 26. A person of ordinary skill in the art will readily understand the construction of various suitable chains and pulleys configured for use as endless rotatable devices in a CVT.

Figure 3:
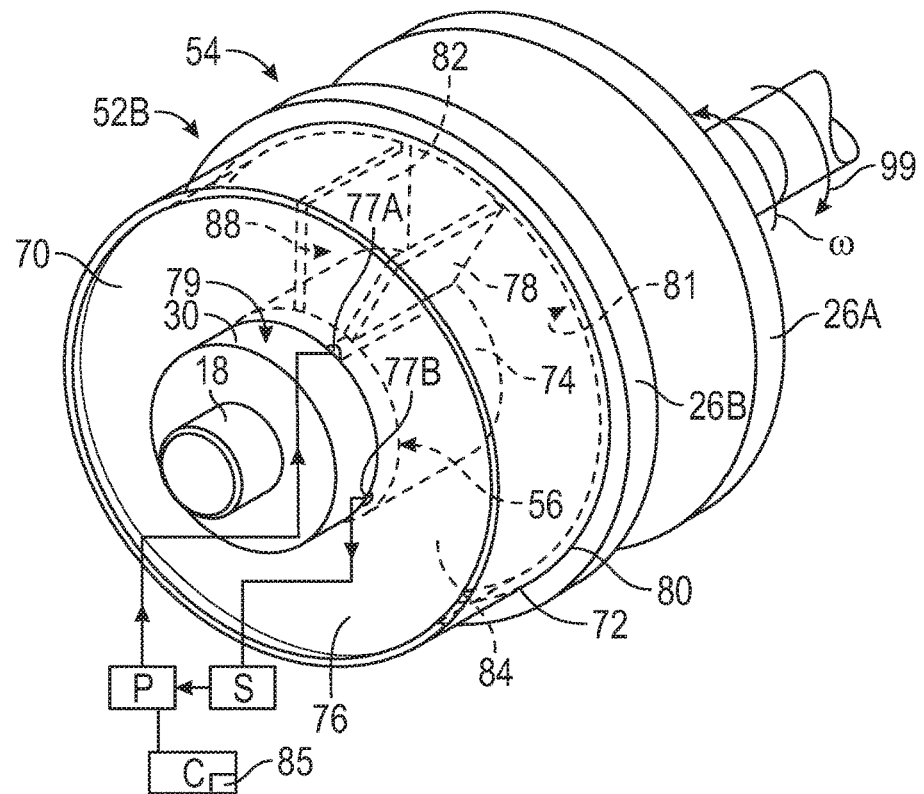
FIG. 3 is a schematic perspective illustration in partial fragmentary view of a portion of the CVT of FIG. 1 showing a rotary piston.
Figure 4:
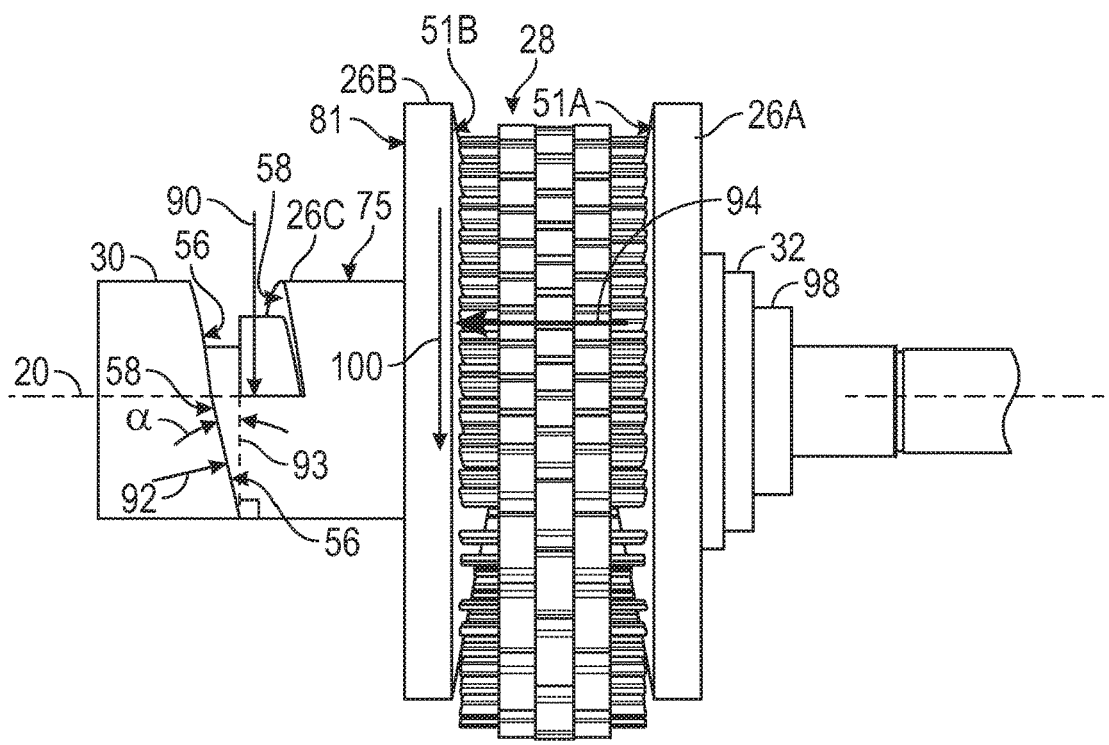
FIG. 4 is a schematic side view illustration in fragmentary view of the CVT of FIG. 1.

The CVT 10 includes an input actuator mechanism 52A operatively connected to the input pulley 24, and an identical output actuator mechanism 52B operatively connected to the output pulley 26. Each of the input actuator mechanism 52A and the output actuator mechanism 52B includes a wedge component 30 and a rotary piston 54. Only the wedge component 30 portion of each of the actuator mechanisms 52A, 52B is shown in FIG. 1, and the rotary pistons 54 are not shown in FIG. 1. The wedge component 30 of the output actuator mechanism 52B is also shown in FIGS. 2-4. The rotary piston 54 is shown in FIG. 3. The output actuator mechanism 52B is controllable to cause slight rotation of the output pulley 26 relative to the output shaft 18 and utilize the mechanical advantage of a wedge to increase clamping force of the endless rotatable device 28 on the pulley 26, adjusting the groove width to change the speed ratio while eliminating slippage. The input actuator mechanism 52A is configured and functions in an identical manner with respect to the input pulley 24 as the output actuator mechanism 52B is configured and functions with respect to the output pulley 26.

The output actuator mechanism 52B includes a wedge component 30 that has a wedge surface 56 interfacing with a ramp surface 58 of the pulley shaft 26C of the output pulley 26. The wedge surface 56 and the ramp surface 58 both incline in an axial direction along the output axis 20 toward the endless rotatable device 28. In the embodiment shown, the surfaces 56, 58 incline along a cylindrical outer diameter of the wedge component 30 and of the output shaft pulley 26C, respectively (i.e., toward the right in FIG. 4). More specifically, surface 56 extends in a helix one turn completely around the perimeter of the wedge component 30, and surface 58 extends in a helix one turn around the perimeter of the pulley shaft 26C. The wedge component 30 and the output pulley shaft 26C each have a step in the axial direction between the beginning and the end of each helical surface 56, 58. FIG. 1 shows a step 60 between the beginning 62 and the end 64 of the ramp surface 58. The beginning 66 and the end 68 of the helical wedge surface 56 of the wedge component 30 are blocked from view and are represented in hidden lines in FIG. 1.

As best shown in FIG. 3, the rotary piston 54 of the output actuator mechanism 52B is operatively connected to the wedge component 30. In the embodiment of FIGS. 1-4, the rotary piston 54 includes a stationary component 70 splined to the wedge component 30 and a rotary component 72 fixed to the axially-movable sheave 26B. The stationary component 70 includes a hollow cylindrical portion 74 that mounts to the outer surface 75 of the pulley shaft 40 and partway over the outer surface 79 of the wedge component 30. The stationary component 70 also includes a radial flange 76 extending radially-outward from the cylindrical portion 74. A vane 78 extends radially outward from the cylindrical portion 74 and is fixed to the cylindrical portion 74. The stationary component 70 is referred to as stationary because it is splined to the output shaft 18 to rotate in unison with the shaft and cannot rotate relative to the output shaft 18.

The rotary component 72 includes a cylindrical cover 80 fixed at one end to the axially-movable sheave 26B. A vane 82 extends radially inward from an inner surface of the cylindrical cover 80. The stationary component 70 and the rotary component 72 enclose a cylindrical volume between the cover 80 and the cylindrical portion 74 and between the flange 76 and the outer side surface 81 of the axially-movable sheave 26B. The vanes 78, 82 are sized to extend radially from the cylindrical portion 74 to the cylindrical cover 80 in the cylindrical volume. The vane 82 can rotate toward or away from the stationary vane 78 as the rotary component 72 rotates with the pulley 26 relative to the shaft 18. Because the wedge component 30 causes the rotary component 72 of the rotary piston 54 to move axially with the axially-movable shave 26B as the rotary component 72 rotates, the rotary component 72 slides axially with the cover 80, and the cover 80 also pull the axially-moveable radial flange 76 of the stationary component 70 to move axially while rotated slightly relative to the cover 80.

As best shown in FIG. 3, a first fluid chamber 84 is defined by the rotary piston 54. The first fluid chamber 84 is defined from the stationary vane 78 clockwise to the rotatable vane 82 in FIG. 3. The first fluid chamber 84 is a portion of the cylindrical volume (i.e., that portion from the fixed vane to the rotatable vane in the clockwise direction). The first fluid chamber 84 is pressurizable with a fluid to apply a rotational force on the movable vane 82. More specifically, the radial flange 76 includes a first aperture 77A and a second aperture 77B both at an inner diameter of the radial flange 76. The apertures 77A, 77B serve as a fluid inlet and as a fluid outlet, respectively. The pressurized fluid level in the first fluid chamber 84 is controlled by an electronic controller C that receives operating parameters I such as driving torque 13 on the input shaft 14, torque load 99 on the output shaft 18, driver torque demand, etc. The controller C includes a processor 85 that is configured to execute stored instructions that, based on the input I, controls a pump P that provides fluid from a fluid source S to control the volume of fluid in the fluid chamber 84, and hence the pressure on the face 88 of the vane 82 exposed to the fluid. The rotational force applied by the rotary piston 54 on the axially-movable pulley 26B is equal to fluid pressure times the surface area of the face 88 of the movable vane 82 exposed to the pressurized fluid. The rotational force urges the axially-movable pulley sheave 26B (and the axially-fixed pulley sheave 26A splined thereto) to rotate slightly (i.e., less than a full rotation) relative to the output shaft 18 and the fixed vane 78. This rotation provides relative motion between the ramp surface 58 and the wedge surface 56, resulting in a wedge force $F_{wedge}$ 92 on the ramp surface 58 and a clamping force $F_{clamp}$ 94 of the endless rotatable device 28 on the pulley 26, both indicated in FIG. 4. It should be appreciated that a clamping force of the endless rotatable device 28 on the pulley 26 or pulley 24 is equal and opposite to a clamping force of the pulley 26 or 24 on the endless rotatable device 28.

The mechanical advantage of the wedge component 30 is the friction force $F_{friction}$ 100 between the endless rotatable device 28 and the frustoconical surface 51B of the output pulley 26 and has the same direction with the piston force $F_{piston}$ 90, thus the friction force $F_{friction}$ 100 helps the piston force $F_{piston}$ 90 to reduce the required actuation force. More specifically, as best shown in FIG. 4, the piston force $F_{piston}$ 90 (i.e., the rotary force of the rotary piston 54) results in a wedge force $F_{wedge}$ 92 due to the angle α of the ramp surface 58 and of the wedge surface 56 relative to a line 93 that is perpendicular to the output axis 20. The wedge force $F_{wedge}$ 92 is normal to the ramp surface 58 and has an axial component that results in axial movement of the movable sheave 26B and a clamping force $F_{clamp}$ 94 of the endless rotatable device 28 against the output pulley 26. The thrust bearing 32 positioned between the axially-fixed sheave 26A and a fixed flange 98 of the output shaft 18 reacts the axial force. The torque load 99 on the output shaft 18 is indicated as being opposite to the direction of rotation ω of the output shaft 18. A friction force $F_{friction}$ 100 between the endless rotatable device 28 and the frustoconical surface 51B of the output pulley 26 is the product of the clamping force $F_{clamp}$ and the coefficient of friction μ between the endless rotatable device 28 and the frustoconical surface 51B of the axially-movable output sheave 26B. The endless rotatable device 28 also creates a friction force along the surface 51A of the axially-fixed sheave 26A of the output pulley 26. A force balance equation of forces acting on the axially-movable sheave 26B is simplified as follows:

$$F_{piston}/F_{clamp} = \tan\alpha - \mu; \quad \text{(EQUATION 1)}$$

where $F_{piston}$ is the rotational force 90 of the pressurized fluid on the rotary component 72 of the rotary piston 54, $F_{clamp}$ is the resulting clamping force 100 of the rotary component 72 against the axially-movable sheave 26B; α is the angle of the wedge surface 56 (and of the ramp surface 58) relative to the line 93 perpendicular to the output axis 20; and μ is the coefficient of friction between the endless rotatable device 28 and the frustoconical surface 51B of the axially-movable sheave 26B. The coefficient of friction μ is dependent on the materials of these components.

As is apparent from the above EQUATION 1, the $F_{piston}$ to maintain the clamping force $F_{clamp}$ can be very small or reduced to zero if the wedge angle is selected so that tan α is very close to or equal to the coefficient of friction μ. Stated differently, the fluid pressure in the fluid chamber 84 can be very small or reduced to zero while maintaining the axial position of the axially-movable sheave 26B after the axial position of the axially-movable sheave 26B is adjusted by the rotary piston 54 to establish a controlled position of the output pulley with a desired speed ratio between the input shaft 14 and the output shaft 18. This reduces pumping energy requirements in comparison to an actuator mechanism that requires a very high actuating fluid pressure to be maintained throughout the operation of the CVT 10 at the established speed ratio. Accordingly, the wedge surface 56, the output pulley 26, and the endless rotatable device 28 are configured so that a fluid pressure of zero in the first fluid chamber maintains a controlled position of the output pulley.

The torque load 99 on the output shaft 18, such as due to the vehicle load will normally be opposite to the direction of rotation of the input shaft 14 and the output shaft 18 (i.e., opposite to the direction of drive torque 13, which may be considered a first direction of rotation), and opposite to the direction of rotation of the rotary component 72 of the rotary piston 54 (i.e., opposite to the direction of relative rotation of the axially-movable pulley sheave 26B). The torque load 99 is thus in the same rotational direction as a rotary component of the wedge force $F_{wedge}$ 92 and thus reinforces the wedge force $F_{wedge}$ 92 against the axially-movable pulley sheave 26B. In a situation where the torque load 99 is in the same direction as the piston force $F_{piston}$ 90, such as when vehicle wheels operatively connected to the output shaft 18 encounter a pothole, or during engine braking, the torque load on the output shaft 18 could be in the same direction as the piston force $F_{piston}$ 90, in which case the fluid pressure can be controllably increased to maintain a wedge force $F_{wedge}$ 92 on the axially-movable pulley sheave 26B.

Referring again to FIG. 1, the axially-movable sheave 24B of the input pulley 24 also has a ramp surface 58 that inclines in an axial direction along the second axis (i.e., the input axis 16) toward the endless rotatable device 28. The endless rotatable device 28 is frictionally engaged with the input pulley 24. The input wedge component 30 has a wedge surface 56 interfacing with the ramp surface 58 of the pulley shaft 24C the axially-movable sheave 24B. The wedge surface 56 and the ramp surface 58 of the input actuator mechanism 52A are configured and function as described with respect to the wedge surface 56 and the ramp surface 58 of the output actuator mechanism 52B. An input rotary piston (not shown) identical to the rotary piston 54 of the output actuator mechanism 52B is operatively connected to the input wedge component 30 and to the axially-movable sheave 24B and defines another fluid chamber pressurizable to apply a rotational force that provides relative motion between the ramp surface 58 of the axially-movable sheave 24B and the wedge surface 56 of the input wedge component 30 resulting in a wedge force on the ramp surface 58 of the input pulley shaft 24C and a clamping force of the endless rotatable device 28 on the input pulley 24 as described with respect to the output actuator mechanism 52B and the output pulley 26.

The input actuator mechanism 52A and the output actuator mechanism 52B can be controlled by the controller C to move the axially-movable sheaves 24B, 26B in response to operating conditions I to vary the speed ratio of the input pulley 24 to the output pulley 26. The controller C will control the fluid pressure to the fluid chamber of the input actuator mechanism 52A so that the net axial force resulting from a clamping force of the endless rotatable device 28 on the pulley 24 and the axial component of the wedge force on the axially-movable pulley sheave 24B causes the axially-movable pulley sheave 24B to move closer to the axially-fixed pulley sheave 24A if the axially-movable pulley sheave 26B is controlled to move further from the pulley sheave 26A, and further from the pulley sheave 24A if the pulley sheave 26B is controlled to move closer to the pulley sheave 26A.

Figure 5:
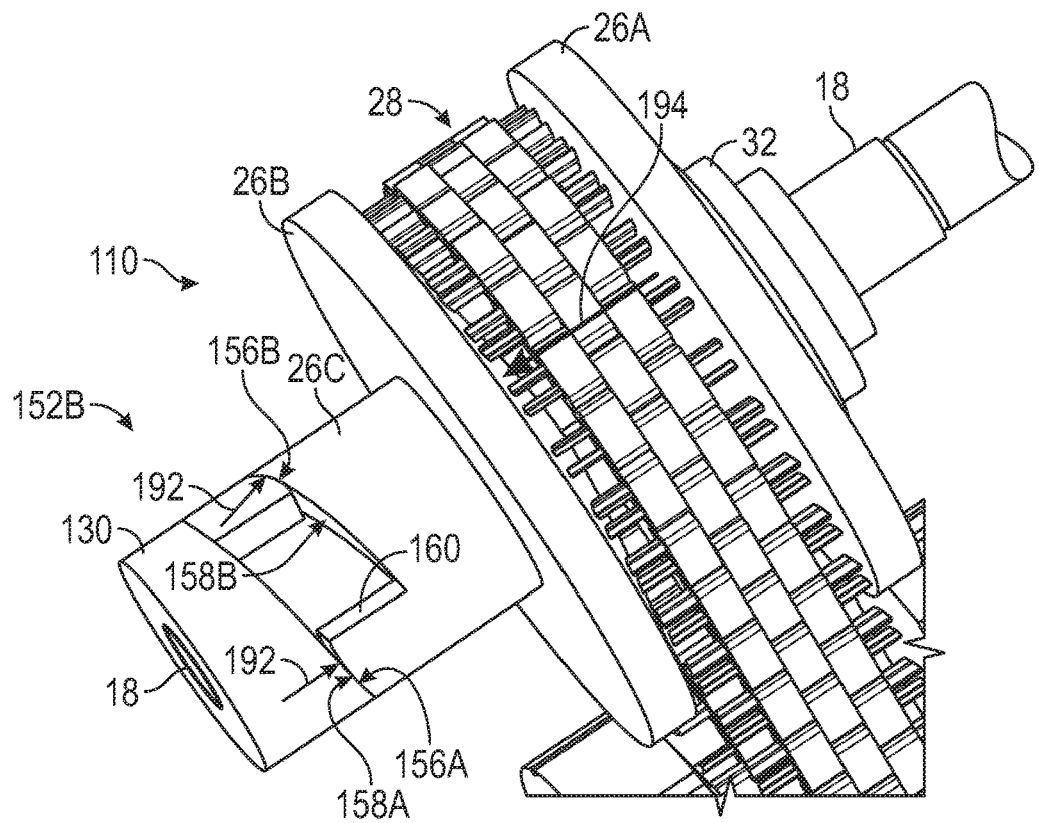
FIG. 5 is a schematic perspective illustration in partial fragmentary view of a second embodiment of a CVT with a dual wedge actuator in accordance with an alternative aspect of the present teachings.

FIG. 5 shows a portion of an alternative embodiment of a CVT 110 alike in all aspects to the CVT 10 except that an output actuator mechanism 152B (and an identical input actuator mechanism (not shown)) is modified to include a dual-wedge surface wedge component, a dual-ramp surface pulley shaft, and a two-chamber rotary piston 254 (FIG. 6) controlled by the controller C as in FIG. 5. More specifically, as shown with respect to output actuator mechanism 152B, the pulley shaft 26C has two helical ramp surfaces 158A and 158B. Unlike ramp surface 58 which winds one complete turn about the pulley shaft 26C, each of the helical ramp surfaces 158A, 158B winds only one-half way (i.e., 180 degrees) about the shaft 26C, with the ramp surface 158A starting at a rotational position at which ramp surface 158B ends and vice versa. In other words, the ramp surfaces 158A, 158B start at the same axial position 180 degrees apart from one another. For that reason, there are two steps 160 positioned 180 degrees apart from one another (only one step 160 is visible in FIG. 5).

The output actuator mechanism 152B also includes a wedge component 130 fixed to the output shaft 18 such that the wedge component 130 rotates in unison with the output shaft 18 and cannot rotate relative to the output shaft 18. The wedge component 130 is alike in all aspects to the wedge component 30, except it includes two helical wedge surfaces 156A, 156B that interface with ramp surfaces 158A and 158B, respectively. The wedge surfaces 156A, 156B of the wedge component 130 is a double helix, while the wedge surface 56 of the wedge component 30 is a single helix. Each wedge surface 156A and 156B and each ramp surface 158A, 158B must have twice the pitch as the wedge surface 56 and the ramp surface 58 in FIG. 1 in order for the axial range of movement of the pulley sheave 26B to be the same (i.e., to have the same length of the step 60 in the axial direction).

In order for a wedge force to provide a force component in the axial direction of equal magnitude to the axial force provided by the wedge force 92 of the embodiment of FIG. 1, the wedge force 192 acting on the ramp surfaces 158A, 158B must be twice that of the wedge force 92. This requires twice the actuation force. Accordingly, a rotary piston included in the output actuator mechanism 152B must have twice the rotary force as that of rotary piston 54. This can be accomplished by using a rotary piston like rotary piston 54 but having a second stationary vane 78 and a second rotary vane 82 that are 180 degrees apart from those shown in FIG. 1 to create two separate hydraulic chambers 84A, 84B as shown with respect to the embodiment of rotary piston 254 of FIG. 6. By including a second vane 82, there is twice as much total surface area that the fluid pressure acts on. A second pair of apertures 77A, 77B is provided in the radial flange 76 (FIG. 3) to enable fluid flow into and out of the second fluid chamber 84B. The second fluid chamber 84B thus increases the total area against which fluid pressure acts, thereby resulting in an additional rotational force, increasing the piston force, resulting in a wedge force 192 at each of the ramp surfaces 158A, 158B so that the sum of the wedge forces 192 is twice the magnitude to the wedge force 92 of FIG. 4. Because of the increased pitch of a double helix wedge component 130, the angle α of the ramp surface 58 and of the wedge surface 56 relative to a line 93 that is perpendicular to the output axis 20 is twice as large in the embodiments with dual chamber pistons. The axial component of the larger wedge force 192 will thus be the same as in the embodiment with a single wedge chamber and a single wedge surface. The wedge forces 192 result in a clamping force 194.

Figure 6:
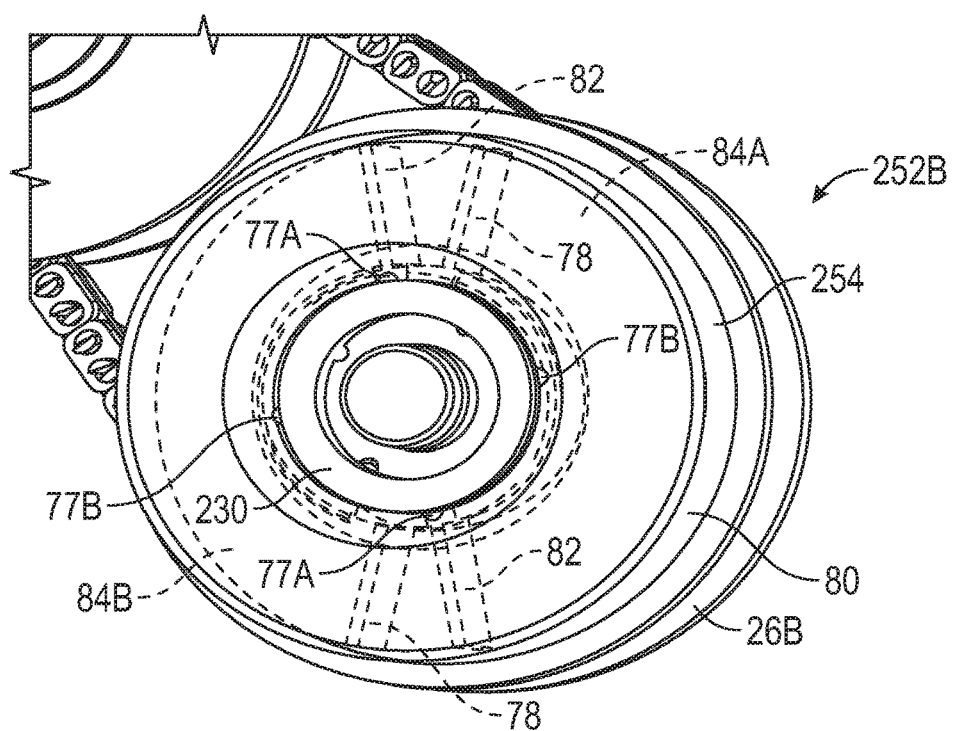
FIG. 6 is a schematic perspective illustration in fragmentary view of a two-chamber rotary piston of the CVT of FIG. 5.

FIG. 6 shows the two-chamber rotary piston 254 as described, but included in a dual-wedge output actuation mechanism 252B that includes what may be referred to as a roller-type dual wedge mechanism. The two-chamber rotary piston 254 of FIG. 6 could instead be used in the output actuation mechanism 152B and with the wedge component 130 of FIG. 5. The dual-wedge embodiment of FIGS. 6 and 7 utilizes a wedge component 230 that has two helical grooves 259A, 259B at an inner cylindrical surface of a wedge component 230. The side surface 256A, 256B of each groove 259A, 259B nearest to the endless rotatable device 28 serves as a wedge surface 256A, 256B such that there are two wedge surfaces.

Figure 7:
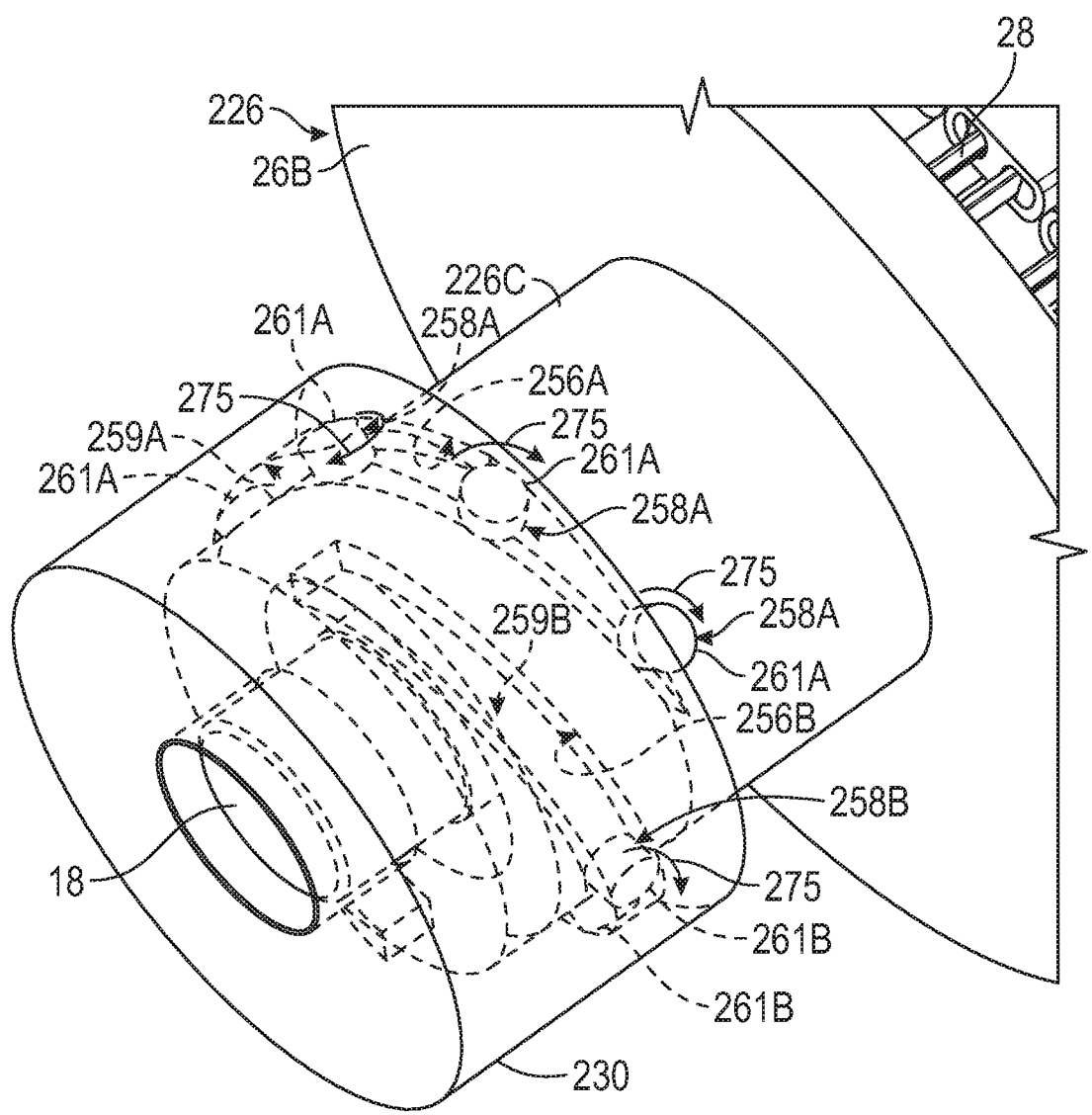
FIG. 7 is a schematic perspective illustration in fragmentary view of a third embodiment of a CVT with a dual wedge actuator in accordance with an alternative aspect of the present teachings.

FIG. 7 shows the output pulley 226 includes the axially-movable sheave 26B but with a pulley shaft 226C that extends along the axis 20 within the wedge component 230. The two-chamber rotary piston 254 is removed in FIG. 7 so that the wedge component 230 is exposed. A first helical array of rolling elements 261A and a second helical array of rolling elements 261B are secured to the pulley shaft 226C.

The rolling elements 261A and 261B are spaced about the outer surface of the pulley shaft 226C such that they incline in the same axial direction as the wedge surfaces 256A, 256B. The rolling elements 261A, 261B are spaced so that rolling elements 261A are captured in the first groove 259A, and additional rolling elements 261B are captured in the second groove 259B. Only some of the rolling elements 261A, 261B are visible in FIG. 7. The rolling elements 261A, 261B are fixed in position on the pulley shaft 226C, but each spins along its center axis (as indicated by arrows 275 in FIG. 7) when the rolling elements 261A, 261B contact the wedge surfaces 256A, 256B as the axially-movable sheave 26B rotates relative to the output shaft 18 under the rotary force of the rotary piston 254. The rotary piston 254 surrounds the wedge component 230 and the pulley shaft 226C in the cylindrical space between the wedge component 230 and the cover 80 as shown in FIG. 6. The side surfaces 258A of the rolling elements 261A that contact the first wedge surface 256A in the first wedge groove 259A serve as the first ramp surface 258A. The side surfaces 258B of the rolling elements 261B that contact the second wedge surface 256B in the second wedge groove 259B serve as the second ramp surface 258B.

Figure 8:
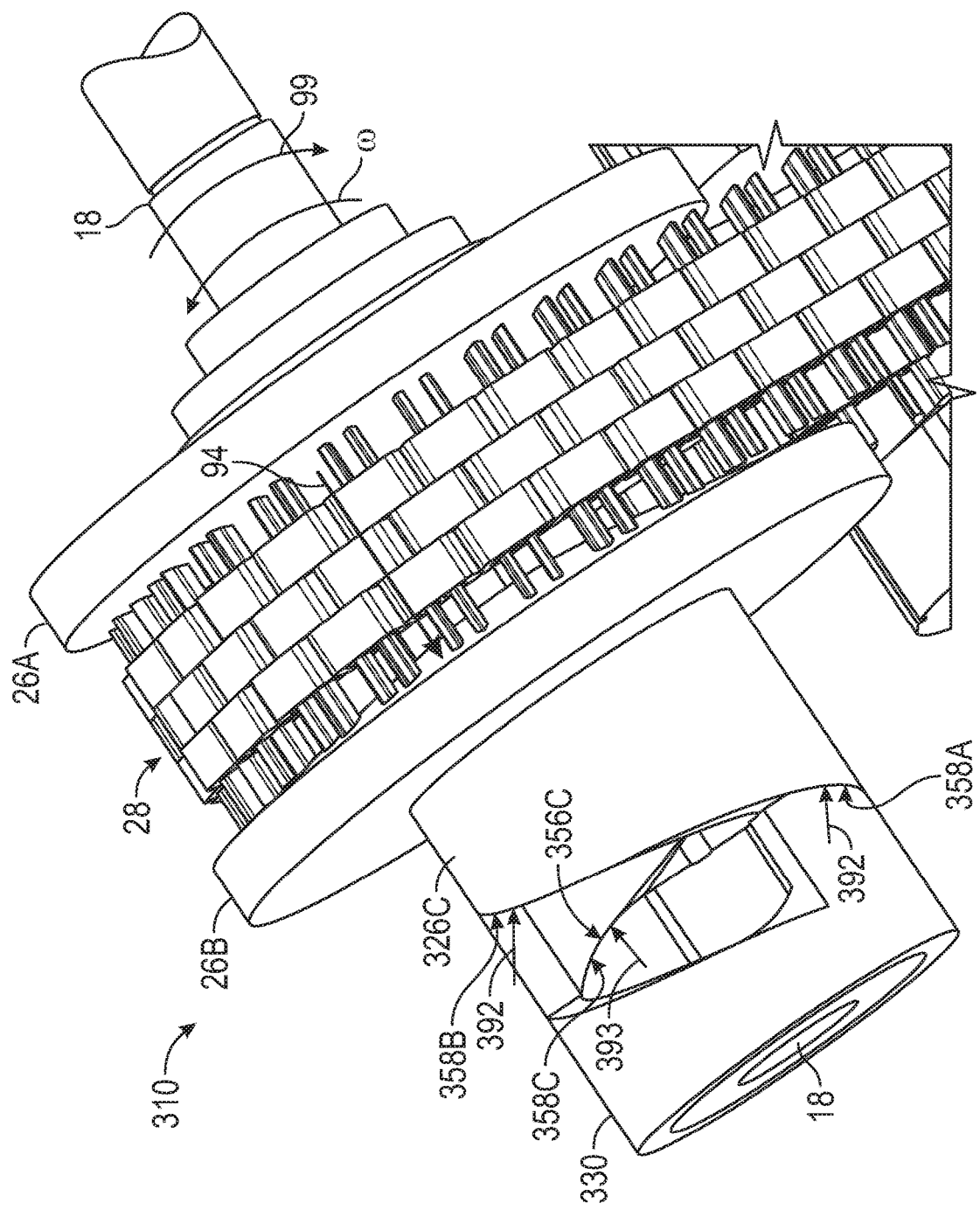
FIG. 8 is a schematic perspective illustration in fragmentary view of a fourth embodiment of a CVT in accordance with an alternative aspect of the present teachings.
Figure 9:
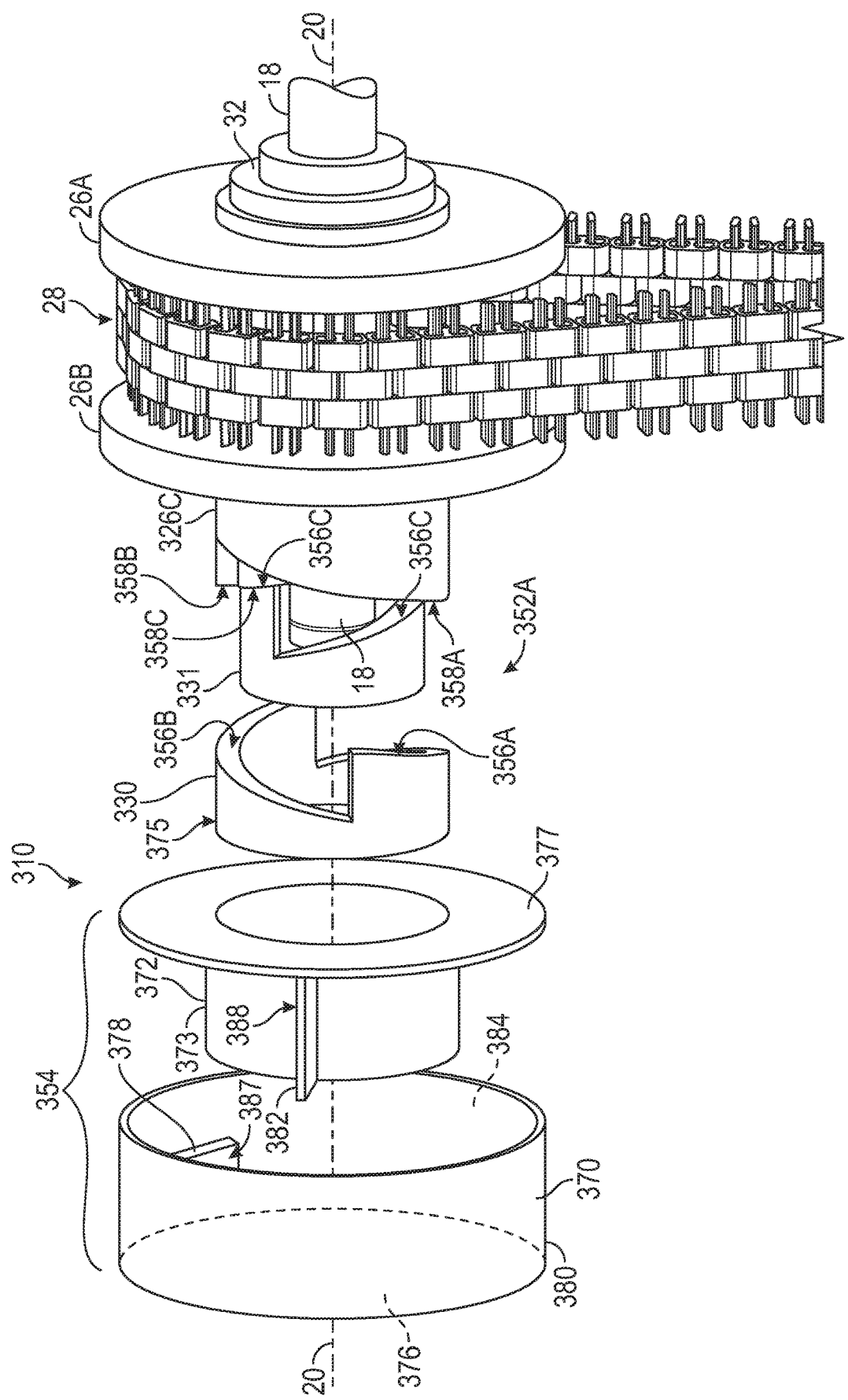
FIG. 9 is a schematic illustration in exploded perspective view of the CVT of FIG. 8.

FIGS. 8 and 9 show another embodiment of a CVT 310 having many of the same components as described with respect to the CVT 10 of FIG. 1. In this embodiment, an actuator mechanism 352A has a wedge component 330 that surrounds the output shaft 18 and is rotatable relative to the output shaft 18 in response to controlled fluid pressure in a rotary piston 354. The rotary piston 354 is controlled by the controller C in the same manner as described with respect to FIG. 1. In contrast to the other embodiments described herein, the wedge component 330 to which the stationary component 370 of the rotary piston 354 is mounted is not fixed to the shaft 18 and can rotate relative to the shaft 18. More specifically, the rotary component 372 of the rotary piston 354 is fixed to the wedge component 330 so that the wedge component 330 rotates with the rotary component 372 when fluid pressure in a fluid chamber 384 of the rotary piston 354 is controlled by the controller C to cause relative rotation of the rotary component 372 and thus phasing of the wedge component 330 relative to the pulley shaft 326C.

Similar to the actuator mechanism 152B, the wedge component 330 has two helical wedge surfaces 356A, 356B that interface with two helical ramp surfaces 358A and 358B of the pulley shaft 326C, respectively. The rotary component 372 of the rotary piston 354 has a cylindrical shaft portion 373 that surrounds and is fixed to an outer surface 375 of the rotary component 372. A radial flange 377 extends from the shaft portion 373, and a vane 382 extends radially outward from the shaft portion 373. The stationary component 370 of the rotary piston 354 is fixed to the shaft 18. More specifically, a radial flange 376 of the stationary component 370 has a central opening at which it is fixedly mounted to an additional wedge component 331. The additional wedge component 331 is in turn fixed to the output shaft 18 such that the stationary component 370 and the additional wedge component 331 rotate with but not relative to the output shaft 18.

The stationary component 370 has a stationary vane 378 that is fixed to the cover 380 of the stationary component 370 and extends radially inward. The fluid chamber 384 is defined between the rotary component 372 and the stationary component 370 from the surface 387 of the stationary vane 378 to the surface 388 of the movable vane 382. The fluid chamber 384 extends from the inner surface of the cover 380 to the outer surface of the shaft portion 373 and from the radial flange 376 to the radial flange 377. When assembled, the rotary piston 354 fits in a cylindrical space around the additional wedge component 331 adjacent the pulley sheave 26B. Fluid pressure in the rotary piston 354 generates wedge forces 392 at the ramp surfaces 358A, 358B as described with respect to the dual wedge surfaces 156A, 156B and wedge surface 56, resulting in a controllable clamping force 94 of the endless rotatable device 28 on the output pulley 26. The input pulley 24 has an identical actuation mechanism operatively connected to the movable sheave 24B of the input pulley 24.

The CVT 310 of FIGS. 8 and 9 includes an additional wedge component 331 that is fixed to the output shaft 18 shaft. The additional wedge component 331 also has dual wedge surfaces. Only one wedge surface 356C is visible in FIG. 9. The dual wedge surfaces of the additional wedge component 331 form another dual helix, each wedge surface spiraling one half turn (180 degrees) around the perimeter of the additional wedge component 331 similar to the wedge surfaces 156A and 156B of the embodiment of FIGS. 5-6. The additional wedge component 331 is surrounded radially-outward by the actuation wedge component 330. The pulley shaft 326C has a second ramp surface 358C and another second ramp surface not visible in FIG. 9 that together form a dual helix. The second ramp surfaces of the pulley shaft 326C are radially-inward of the ramp surfaces 358A, 358B. The second ramp surfaces interface with wedge surfaces 356C (and the other wedge surface not shown) of the additional wedge component 331. The second ramp surfaces of the pulley shaft 326C incline in an opposite direction along the axis 20 than the ramp surfaces 358A, 358B that interface with the wedge surfaces 356A, 356B of the actuation wedge component 330. For this reason, the actuation mechanism 352A is referred to as a cross-wedge.

The actuation wedge component 330 can rotate relative to the additional wedge component 331. A bearing may be placed between the inner surface of the actuation wedge component 330 and the additional wedge component 331 to aid in this relative rotation. A torque load 99 on the output shaft 18 is in an opposite direction as the direction of rotation of the output pulley 26 under the force of the endless rotatable device 28. Accordingly, a wedge force due to this torque is indicated as wedge force 393 in FIG. 8. This wedge force 393 has a component acting in the same axial direction as the wedge forces 392 of the actuation wedge component 330 and thus results in an additional clamping force of the endless rotatable device 28 against the movable sheave. The wedge force 393 is generated due to the torque 99 automatically (i.e., not under the control of the controller C) and the additional wedge 331 is referred to as a self-reinforcement wedge.

In each embodiment disclosed herein, a clamping force on the movable sheave 26B is controlled and pumping losses are minimized by utilizing the mechanical advantage of wedge components 30, 130, 230, 330.

FIGS. 10-15 illustrate various embodiments of powertrains having a CVT 10 as described herein, but utilizing any of various disclosed linear actuators rather than rotary actuation via a rotary piston. Additionally, each of the embodiments of FIGS. 10-15 utilizes wedge components configured to automatically provide an axial component of a wedge force $F_{wedge}$ against the ramp surface of the respective movable pulley given the direction of input drive torque and the direction of reaction torque due to the load on the output shaft. The linear actuator provides a controllable axial force. The thrust bearing 32 reacts the axial forces, and a resulting clamping force $F_{clamp}$ is as follows:

$$F_{clamp} = F_{wedge\ axial} + F_{linear\ actuator} \quad \text{(EQUATION 2)}$$

Because the automatic wedge force may be relied on for a significant portion of the clamping force, an electric or hydraulic pump that may be included in a given actuator mechanism described herein may be "downsized" relative to typical powertrain pumps. For example, the axial component of the wedge force may provide 90 percent of the desired clamping force in the embodiments described herein, or may provide a different percentage of the required wedge force dependent on the angle of incline of the wedge surface to the axis of rotation.

Figure 10:
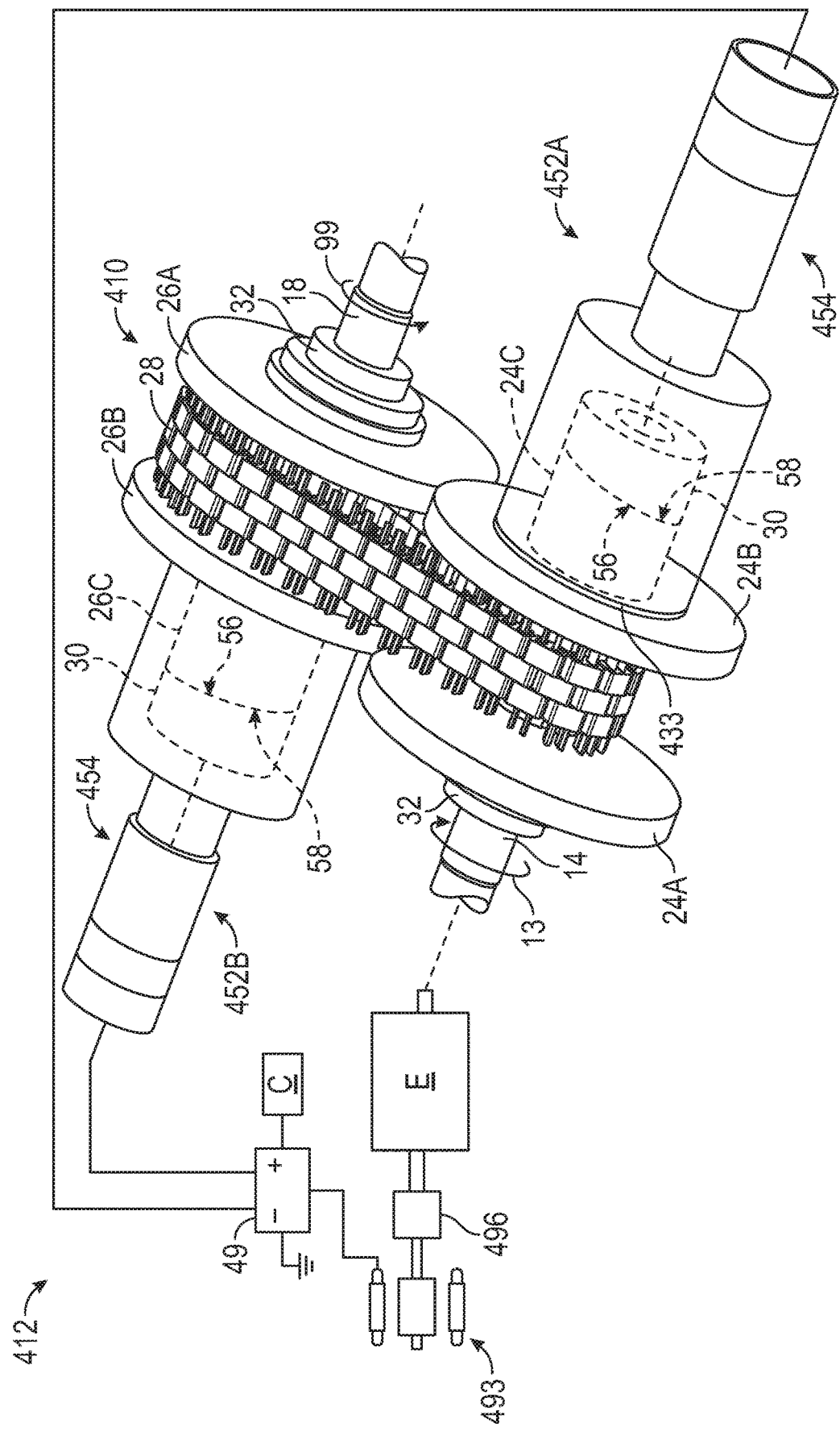
FIG. 10 is a schematic perspective illustration in fragmentary view of a hybrid powertrain with a fifth embodiment of a CVT in accordance with an alternative aspect of the present teachings.

More specifically, FIG. 10 shows a powertrain 412 with an alternative embodiment of a CVT 410 alike in all aspects to CVT 10 except that actuator mechanisms 52A, 52B having rotary pistons 54 are replaced with input actuator mechanism 452A and output actuator mechanism 452B having linear actuators 454 as described herein. Moreover, the input actuator mechanism 452A and the output actuator mechanism 452B are independently (i.e., separately) controllable by electronic controller C to enable activation of only one or of both actuators input and output linear actuators 454 simultaneously to provide an axial force $F_{linear\ actuator}$ 490 to affect the overall clamping force $F_{clamp}$ 494 of the input pulley 24 or the output pulley 26, respectively. Additionally, the wedge surface 56 and the ramp surface 58 need not wind a full turn around the perimeter of the input pulley shaft 24C or output pulley shaft 26C as only 90-120 degrees of rotation is required for a full range of axial motion to adjust the position of the axially movable sheaves 24B, 26B.

The CVT 410 includes the variator assembly 22 that includes a pulley supported on the shaft. The input wedge component 30 has a wedge surface 56 that automatically engages the ramp surface 58 of movable sheave 24B when drive torque 13 on the input shaft 14 is in the first direction shown in FIG. 10. The first direction may be the direction of drive torque of an engine E included in the hybrid powertrain. Although shown only with a broken line connection, a crankshaft of the engine E is operatively connectable to drive the input shaft 14 as understood by those skilled in the art. Similarly, the wedge surface 56 of the output wedge component 30 automatically engages the ramp surface 58 of the output pulley 26 when torque load 99 is on the output shaft 18, with the wedge surface 56 applying an axial wedge force on the ramp surface 58. The axial wedge force $F_{wedge\ axial}$ 492 of the wedge component 30 and the axial force 490 of the linear actuator 454 of the actuator mechanism 452A or 452B together contribute to the clamping force $F_{clamp}$ 494 of the endless rotatable device 28 on the moveable sheave 24B or 26B, respectively. Accordingly, under operating conditions when the axial wedge force $F_{wedge\ axial}$ 492 needs to be supplemented in order to achieve a desired clamping force $F_{clamp}$ 494 or in order to change a ratio of the CVT 410, the linear actuator 454 can be controlled to provide a desired axial force 490.

Because at each pulley 24, 26 only the axial component $F_{wedge\ axial}$ 492 of the wedge force 92 contributes to the clamping force $F_{clamp}$ 494, the ratio of the wedge force 92 to the clamping force $F_{clamp}$ 494 is dependent on the angle $\alpha$ of the wedge surface 56 relative to a line 93 that is perpendicular to the axis of rotation of the input shaft 14 (i.e., input axis 16) or to the axis of rotation of the output shaft 18 (i.e., output axis 20), respectively.

Figure 11:
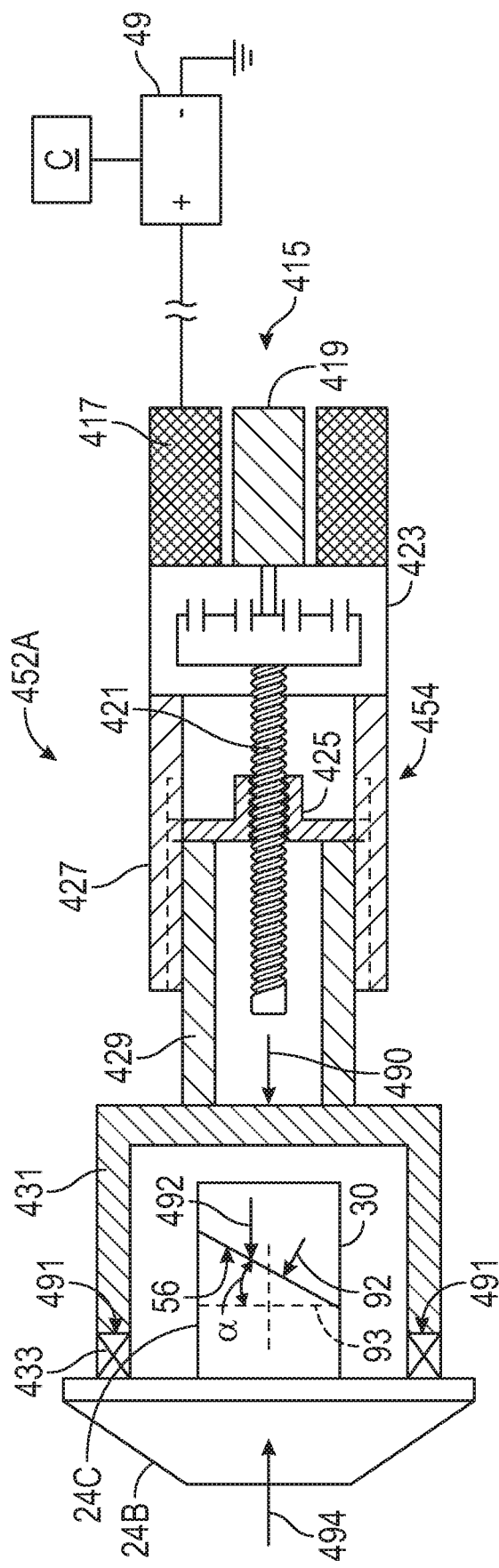
FIG. 11 is a schematic cross-sectional illustration of an electric linear actuator included in the CVT of FIG. 10.

The output linear actuator 454 is identical to and functions as described with respect to input linear actuator 454 shown in FIG. 11 except that it provides an axial force $F_{linear\ actuator}$ 490 on the movable sheave 26B of the output pulley 26B. Both are activated by electrical power provided from a battery 49. The electronic controller C is operable to independently control the input linear actuator and the output linear actuator.

The axial force $F_{linear\ actuator}$ 490 applied by the linear actuator 454 may be at least partially in response to the torque provided by the engine E. Stated differently, the controller C may monitor the input torque 13 and activate the linear actuator 454 to provide an axial force $F_{linear\ actuator}$ 490 that varies in response to variation of the input torque 13. For example, an electric machine 493 may be operatively connected to the engine E such as via a planetary gear set 496, which may be a simple planetary gear set or a complex planetary gear set and may include one or more controllable, selectively engagable clutches (not shown). During engine braking, the electric machine 493 may be controlled to function as a generator using torque provided by the engine E. The axial force $F_{linear\ actuator}$ 490 provided by the linear actuator 454 is varied in response to the torque provided by the engine E to the electric machine 493.

With reference to FIG. 11, the linear actuator 454 comprises an electric motor 415 having a stator 417 and a rotatable rotor 419. The stator 417 is selectively powered by the battery 49 via the controller C to cause rotation of the rotor 419. The rotor 419 is operatively connected to a lead screw 421, optionally via a gearing mechanism 423 such as a simple planetary gear set that can multiply torque. Rotation of the lead screw 421 causes axial travel of a threaded nut 425. The nut 425 is splined to a tubular housing 427. Both the nut 425 and the housing 427 are non-rotatable. The nut 425 travels axially relative to the housing 427 when the lead screw 421 rotates. A tube 429 is fixed to the nut 425 and slides axially with the nut 425 relative to the housing 427. The tube 429 is fixed to a hollow cylinder 431 that interfaces with a bearing 433 secured to the axial end of the movable sheave 24B. The cylinder 431 moves axially with the nut 425 and the tube 429 without rotating, and adjusts the axial position of the movable sheave 24B. The movable sheave 24B can rotate relative to the cylinder 431 due to the bearing 433. The electric motor 415 is activated by the electronic controller C in response to predetermined powertrain 412 operating conditions to turn the lead screw 421 and thereby apply an axial force 490 that is depicted as centrally located on the cylinder 431 but is actually applied along the annular surface 491 of the bearing 433 to the sheave 24B. The actuating mechanism 452B has an identical linear actuator 454 that provides axial force to move the movable sheave 26B. The actuator mechanism is electrically powered and is characterized by an absence of hydraulic actuation.

Figure 12:
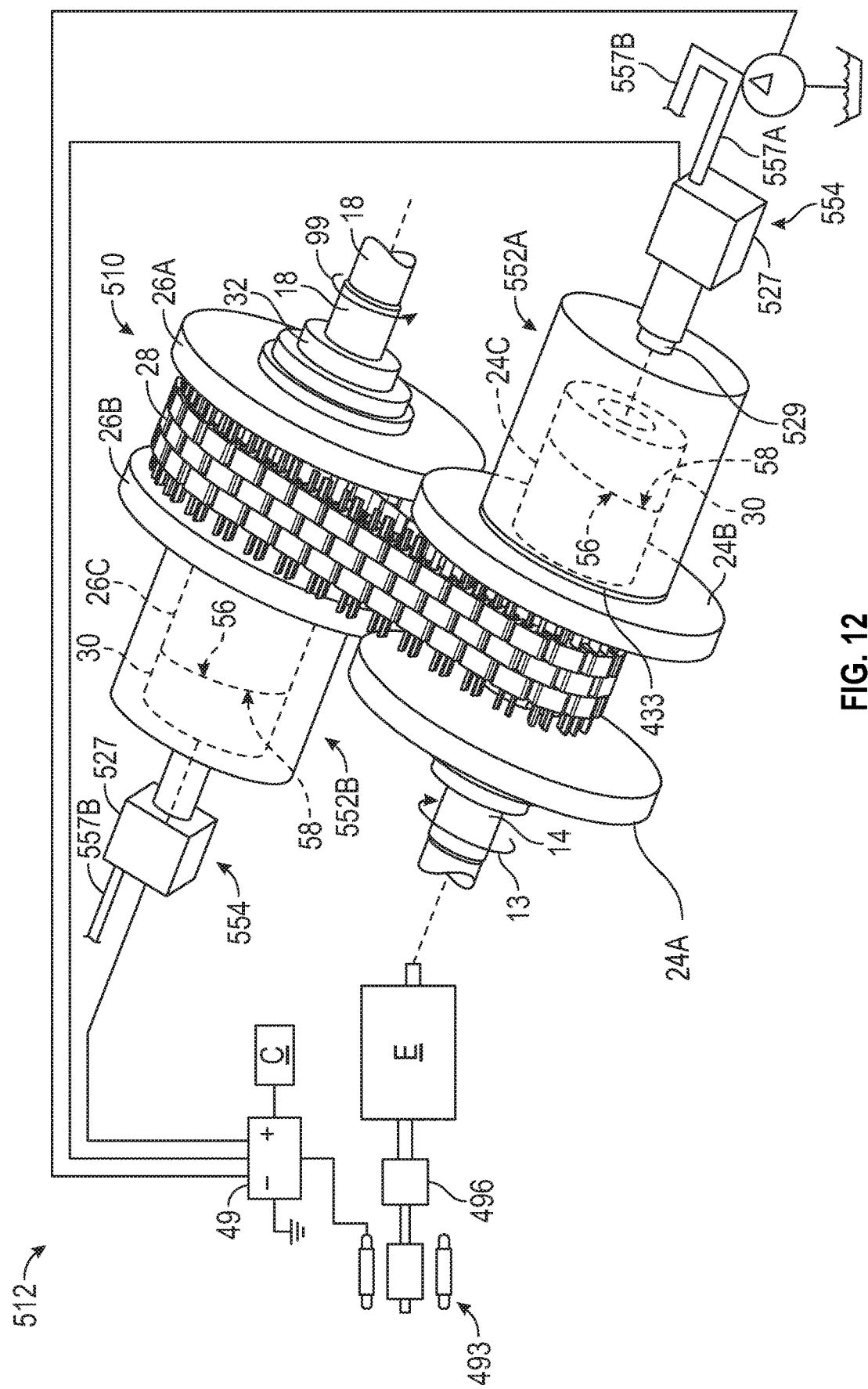
FIG. 12 is a schematic perspective illustration in fragmentary view of a hybrid powertrain with a sixth embodiment of a CVT in accordance with an alternative aspect of the present teachings.
Figure 13:
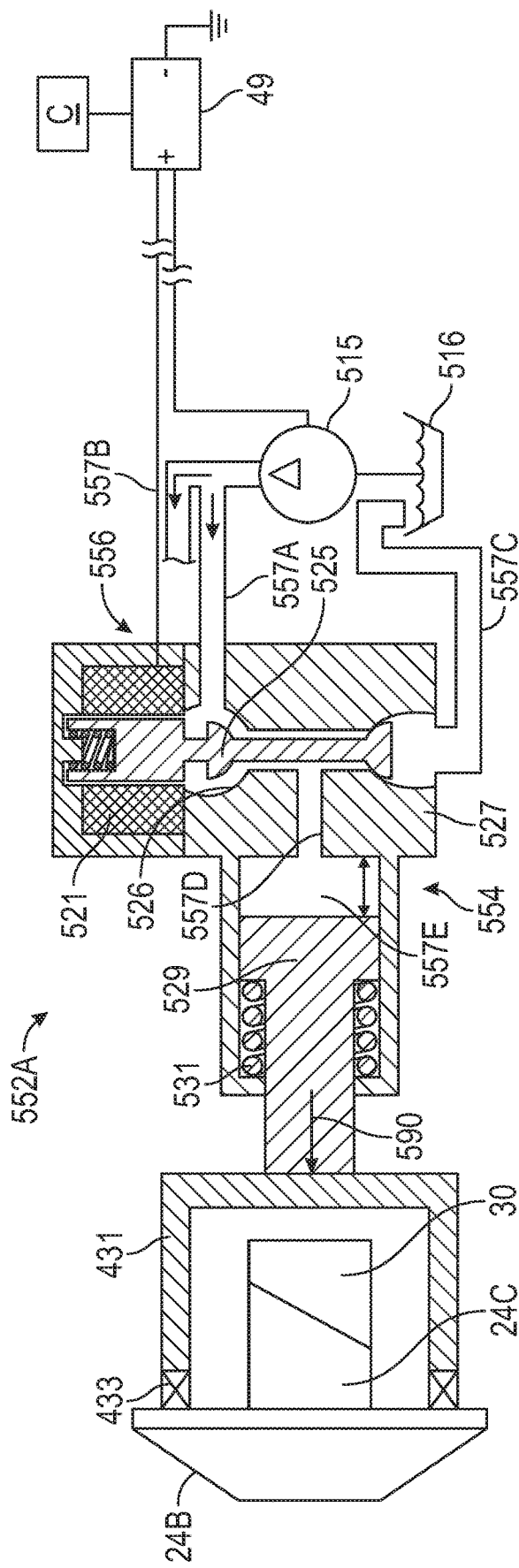
FIG. 13 is a schematic cross-sectional illustration of a hydraulic actuator and an electric pump included in the CVT of FIG. 12.

FIGS. 12-13 show a powertrain 512 with an alternative embodiment of a CVT 510. The powertrain 512 is alike in all aspects to powertrain 412, and the CVT 510 is alike in all aspects to CVT 10 and CVT 410 except that input actuator mechanism 552A and an output actuator mechanism 552B are used, each having a linear actuator 554 as described herein. The input linear actuator mechanism 552A and the output linear actuator mechanism 552B share a common electric pump 515. The electric pump 515 is powered by the battery 49. Each of the input linear actuator mechanism 552A and the output linear actuator mechanism 552B also include a hydraulic system 556. The hydraulic system 556 includes hydraulic supply channels 557A, 557B and a hydraulic linear actuator 554. The hydraulic supply channels 557A, 557B, route fluid from a sump 516 that is pressurized by the pump 515 to the respective input and output actuators 554. A hydraulic exhaust channels 557C at each of the hydraulic linear actuators 554 routes fluid from linear actuator 554 back to the pump 515.

The hydraulic system 556 includes a solenoid valve 521 operatively connected to the electronic controller C via the battery 49 such that the electronic controller C selectively energizes the valve 521 in response to predetermined powertrain 512 operating conditions such that a poppet of a valve member 525 is moved away from a valve seat 526 of a valve housing 527 to permit the pressurized hydraulic fluid to pass from the respective supply channel 557A or 557B to a control passage 557D and a supply chamber 557E where the pressurized fluid acts against a piston 529 to move the piston axially against the force of a return spring 531, applying an axial force 590 on the movable sheave 24B at the bearing 433 via the cylinder 431, similarly as described with respect to axial force 490 of FIG. 11. The controller C can also discontinue electrical power to the valve 521, allowing the valve member 525 to seat, and thereby allowing some or all of the fluid in the chamber 557E to exhaust back to the pump 515. Other arrangements of hydraulic solenoid valves that provide an axial force 590 may be used.

The output actuating mechanism 552B has an identical linear actuator 554 that provides axial force to move the movable sheave 26B. Because each actuator 554 has a controllable valve 521, the linear actuator 554 of the input actuator mechanism 552A and the linear actuator 554 of the output actuator mechanism 552B are independently activated via fluid in the hydraulic system that is pressurized by the electric pump 515. In other words, axial force can be applied to the sheave 24B without applying an axial force to sheave 26B, or by applying a different amount of axial force to sheave 26B, or the same level of axial force can be applied to both sheaves 24B, 26B. Powertrain 512 operating conditions that may trigger the controller C to activate one or both actuators 554 include a hybrid stop-start mode in which the engine E is shut down such as at a stop light or during highway cruising. The pump 515 can be the only pump used for providing hydraulic pressure to the powertrain 512. In other words, the same pump 515 can be used during engine only operating modes, and during hybrid operating modes. The pump 515 may be of a relatively small capacity given the axial component of the automatic wedge force providing much of the clamping force 494. For example, the electric pump 515 may have a capacity of less than or equal to 10 bar.

Figure 14:
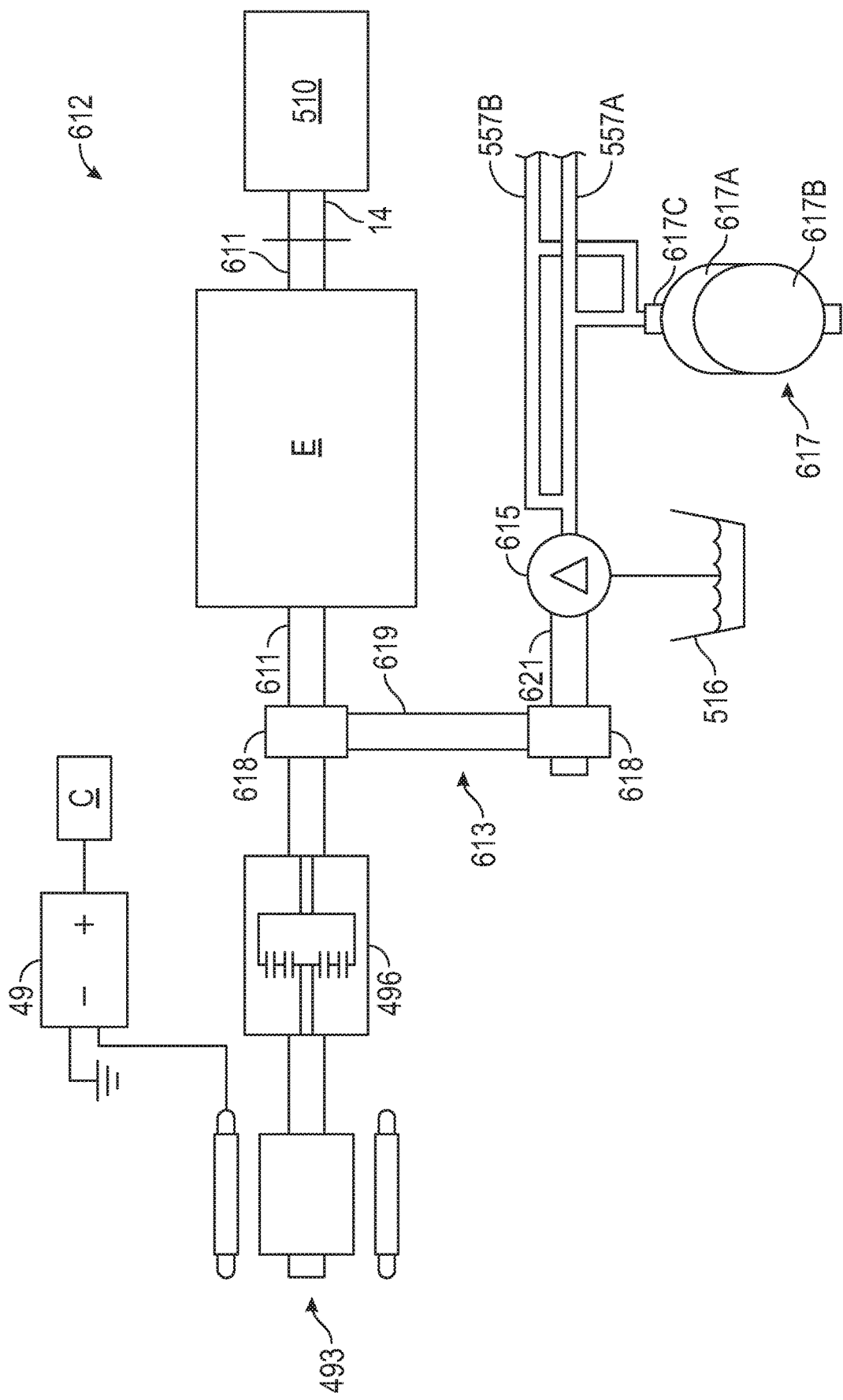
FIG. 14 is a schematic perspective illustration in fragmentary view of a hybrid powertrain with a mechanical pump and a hydraulic accumulator for use with the CVT and hydraulic actuator of FIG. 13.

FIG. 14 shows another embodiment of a powertrain 612 that can be used in place of powertrain 512 with the CVT 510 of FIG. 12. The CVT 510 is represented more schematically in FIG. 14, showing only the input shaft 14 secured for rotation with a crankshaft 611 of the engine E. The powertrain 612 has the same components as powertrain 512, except that an engine driven hydraulic pump 615 and a hydraulic accumulator 617 are used in place of electric pump 515. The input actuator mechanism 552A and an output actuator mechanism 552B are used, each having a linear actuator 554 as described herein.

The pump 615 is mounted on an accessory shaft 621 that is rotatably driven via the engine E by a belt drive 613 that transfers torque from the crankshaft 611 via pulleys 618 mounted to the respective shafts 611, 621 and a belt 619 engaged with the pulleys 618. The pump 615 may be, for example, a balanced vane pump.

A hydraulic accumulator 617 is downstream of the outlet of the pump 615 and receives fluid pressurized by the pump 615. The hydraulic accumulator 617 maintains a reserve of the pressurized fluid in a fluid chamber 617A. A gas chamber 617B contains gas that is further pressurized when the volume of the gas chamber 617B is decreased by the fluid entering the fluid chamber 617A. A valve assembly 617C allows the pressurized fluid to enter, but not to exit the accumulator 617 until the fluid pressure in the hydraulic supply channels 557A, 557B drops below a predetermined pressure, at which pressure the accumulator 617 supplements the line pressure.

Accordingly, under powertrain operating conditions in which the engine E is running (providing torque to the crankshaft 611), the engine driven pump 615 is operable to supply fluid pressure to activate the linear actuators 554 when the controller C energizes the solenoid valves 521. Additionally, because the axial wedge force provides a significant portion of the required clamping force, the pump 615 can be of a relatively small capacity given the axial component of the automatic wedge force providing much of the clamping force. For example, the engine-driven hydraulic pump 615 may have a capacity of less than or equal to 20 bar. When the engine E is not running, such as during a hybrid stop-start mode, the accumulator 617 provides a sufficient reserve of hydraulic pressure to enable the hydraulic linear actuators 554 at the sheaves 24B, 26B to function under the control of controller C.

Figure 15:
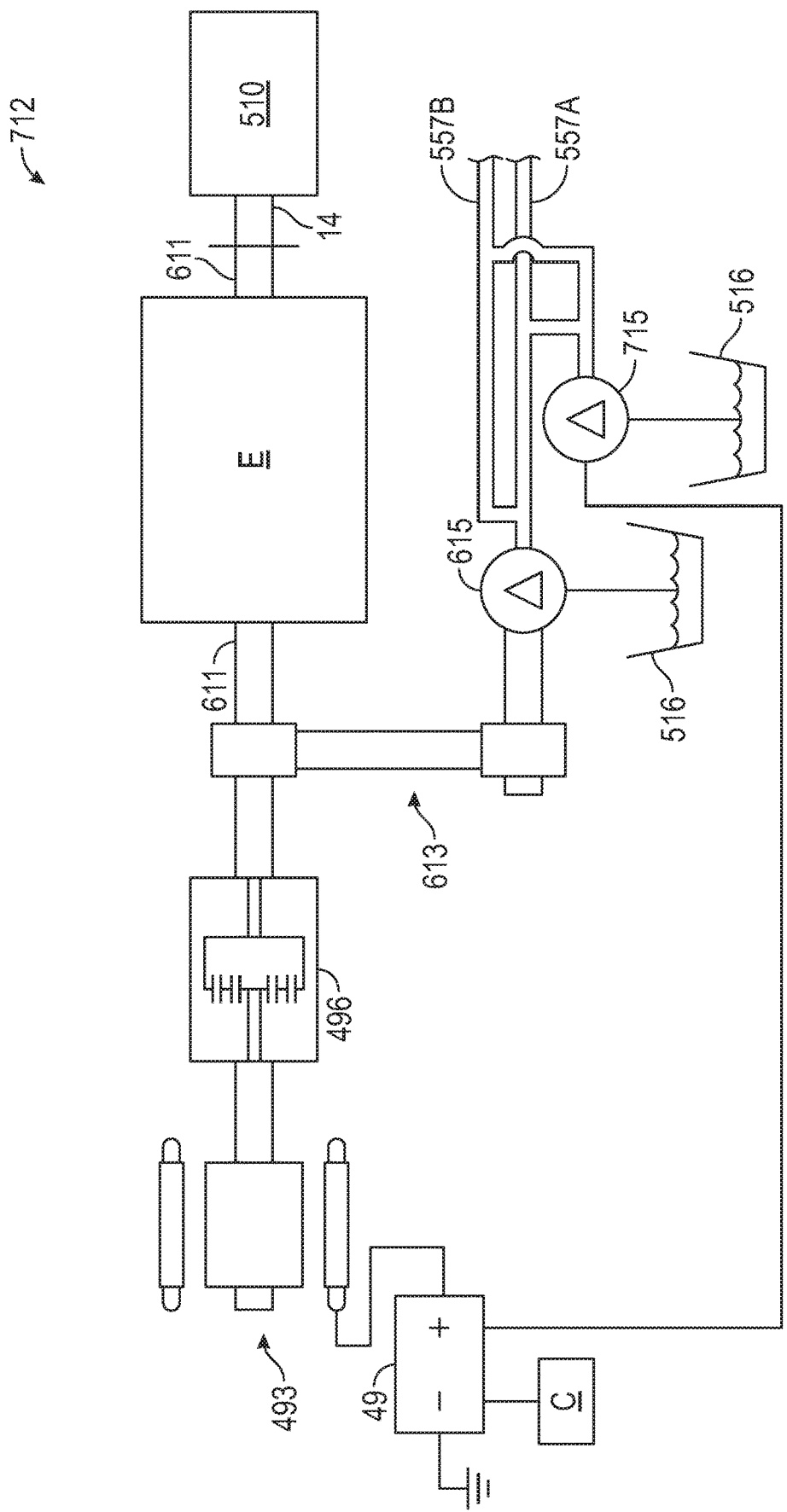
FIG. 15 is a schematic perspective illustration in fragmentary view of a hybrid powertrain with a mechanical pump and an electric pump for use with the CVT and hydraulic actuator of FIG. 13.

FIG. 15 shows another embodiment of a powertrain 712 that can be used in place of powertrain 512 with the CVT 510 of FIG. 12. The CVT 510 is represented more schematically in FIG. 14, showing only the input shaft 14 secured for rotation with a crankshaft 611 of the engine E. The powertrain 712 has the same components as powertrain 612, except that an electric pump 715 is used in place of the hydraulic accumulator 617. The input actuator mechanism 552A and an output actuator mechanism 552B are used, each having a linear actuator 554 as described herein. Accordingly, the hydraulic linear actuators 554 at sheaves 24B and 26B can be actuated using hydraulic pressure supplied by either or both of the engine driven mechanical pump 615 or the electric pump 715.

Accordingly, under powertrain operating conditions in which the engine E is running (providing torque to the crankshaft 611), the engine driven pump 615 is operable to supply fluid pressure to activate the linear actuators 554 when the controller C energizes the solenoid valves 521. Additionally, because the axial wedge force provides a significant portion of the required clamping force, the pump 615 can be of a relatively small capacity given the axial component of the automatic wedge force providing much of the clamping force. For example, the engine-driven hydraulic pump 615 may have a capacity of less than or equal to 20 bar. When the engine E is not running, such as during a hybrid stop-start mode, the electric pump 715 can provide hydraulic pressure to enable the hydraulic linear actuators 554 at the sheaves 24B, 26B to function under the control of controller C. During high demand maneuvers, such as vehicle wide open throttle launch and tip in acceleration, the capability of both pumps 615, 715 may be needed to quickly generate sufficient hydraulic pressure to provide a desired linear axial force on one or both movable sheaves 24B, 26B.

While the best modes for carrying out the many aspects of the present teachings have been described in detail, those familiar with the art to which these teachings relate will recognize various alternative aspects for practicing the present teachings that are within the scope of the appended claims.

The invention claimed is:
1. A powertrain comprising:
a continuously variable transmission including:
    a shaft rotatable about an axis;
    a variator assembly including:
        a pulley supported on the shaft and having a movable sheave with a ramp surface, wherein the movable sheave is axially and rotatably movable on the shaft; wherein the pulley has an axially-fixed sheave rotatably movable relative to the shaft, and the movable sheave is splined to the axially-fixed sheave;
        an endless rotatable device frictionally engaged with the movable sheave; and
    an actuator mechanism including:
        a wedge component supported on the shaft; wherein the wedge component has a wedge surface that automatically engages the ramp surface when torque on the shaft is in a first direction, with the wedge surface applying a wedge force on the ramp surface; and
        an actuator that is operatively connected to the movable sheave and is configured to be activated to apply a force on the movable sheave.
2. The powertrain of claim 1, further comprising:
a thrust bearing positioned between the axially-fixed sheave and the shaft.
3. The powertrain of claim 1, wherein the shaft is an input shaft, the axis is an input axis, the pulley is an input pulley, the wedge component is an input wedge component, and the actuator mechanism is an input actuator mechanism, and the actuator is an input linear actuator;
the continuously variable transmission further including:
    an output shaft rotatable about an output axis;
    wherein the variator assembly further includes an output pulley rotatably supported by the output shaft; wherein the endless rotatable device is frictionally engaged with the output pulley;
    an output actuator mechanism comprising:
        an output wedge component supported on the output shaft; wherein the output wedge component has a wedge surface that automatically engages with the ramp surface of the output pulley when torque on the output shaft is in the first direction with the wedge surface of the output wedge component applying a wedge force on the ramp surface of the output pulley; and
        an output linear actuator that is operatively connected to the movable sheave of the output pulley and is configured to be activated to apply a force on the movable sheave of the output pulley;
    wherein the wedge force of the output wedge component and the force of the output linear actuator together contribute to a clamping force of the endless rotatable device on the movable sheave of the output pulley; and
    wherein the input linear actuator and the output linear actuator are configured to be activated independently of one another.
4. The powertrain of claim 1, wherein the actuator is a linear actuator and the force applied by the linear actuator is an axial force along the axis, the linear actuator comprising:
    an electric motor;
    a linearly movable screw operatively connected to the movable sheave; and
    a gearing mechanism operatively connecting the electric motor to the linearly movable screw;

wherein the actuator mechanism further comprises an electronic controller operatively connected to the electric motor and responsive to powertrain operating conditions; and wherein the electronic controller is configured to activate the electric motor in response to the powertrain operating conditions to move the linearly movable screw to apply the axial force on the movable sheave.

5. The powertrain of claim 1, wherein the shaft is an input shaft, and further comprising:
an engine coupled to the input shaft and driving the input shaft with torque in the first direction; and
wherein the force applied by the actuator is at least partially in response to the torque provided by the engine.

6. The powertrain of claim 5, further comprising:
an electric machine operatively connected to the engine and controllable to function as a generator using torque provided by the engine; and
wherein the force provided by the actuator is varied in response to the torque provided by the engine to the generator.

7. The powertrain of claim 5, wherein the actuator mechanism further comprises:
an electric pump;
a hydraulic system; and
an electronic controller operatively connected to the hydraulic system;
wherein the actuator is configured to be activated via fluid in the hydraulic system that is pressurized by the electric pump.

8. The powertrain of claim 7, wherein the electric pump has a capacity of less than or equal to 10 bar.

9. The powertrain of claim 5, wherein the actuator mechanism further comprises:
a mechanical pump configured to be driven by the engine;
a hydraulic system,
an accumulator pressurizable with fluid by the mechanical pump; and
an electronic controller operatively connected to the hydraulic system and to the engine;
wherein the actuator is activated by fluid in the hydraulic system that is pressurized by the mechanical pump when the engine is running; and
wherein the actuator is activated by fluid in the hydraulic system that is released from the accumulator when the engine is not running during a hybrid start-stop mode.

10. The powertrain of claim 9, wherein the mechanical pump has a capacity of less than or equal to 20 bar.

11. The powertrain of claim 5, wherein the actuator mechanism further comprises:
a mechanical pump driven by the engine;
an electric pump;
a hydraulic system; and
an electronic controller operatively connected to the hydraulic system and to the engine;
wherein the actuator is activated by fluid in the hydraulic system pressurized by the mechanical pump when the engine is running in a first set of operating conditions; and
wherein the actuator is activated by fluid in the hydraulic system pressurized by the electric pump both during a second set of operating conditions requiring greater fluid pressure than the first set of operating conditions, and when the engine is not running during a hybrid start-stop mode.

12. The powertrain of claim 1, wherein the wedge surface and the ramp surface are configured so that a ratio of the wedge force to a clamping force of the endless rotatable device on the movable sheave is dependent on an angle of incline of the wedge surface relative to the axis of rotation of the shaft.

13. A powertrain comprising:
a continuously variable transmission including:
an input shaft rotatable about an input axis and an output shaft rotatable about an output axis;
a variator assembly including:
an input pulley supported on the input shaft and an output pulley supported on the output shaft, each of the input pulley and the output pulley having a movable sheave with a ramp surface; wherein the movable sheave of the input pulley is axially and rotatably movable on the input shaft and the movable sheave of the output pulley is axially and rotatably movable on the output shaft; and
an endless rotatable device frictionally engaged with the input pulley and with the output pulley;
wherein the input pulley has an axially-fixed sheave rotatably movable relative to the input shaft, and the movable sheave of the input pulley is splined to the axially-fixed sheave of the input pulley; and
wherein the output pulley has an axially-fixed sheave rotatably movable relative to the output shaft, and the movable sheave of the output pulley is splined to the axially-fixed sheave of the output pulley;
an actuator mechanism comprising:
an input wedge component supported on the input shaft and an output wedge component supported on the output shaft, each of the input wedge component and the output wedge component having a wedge surface that automatically engages the ramp surface of the respective input pulley and output pulley when torque on the input shaft is in a drive direction and a load reaction torque is on the output shaft, with the wedge surface applying an axial wedge force on the ramp surface;
an input linear actuator that is operatively connected to the movable sheave of the input pulley and is configured to be activated to apply an axial force along the input axis and on the movable sheave of the input pulley; and
an output linear actuator to apply an axial force along the output axis and on the movable sheave of the output pulley; and
an electronic controller operable to control the input linear actuator and the output linear actuator independently of one another.

14. The powertrain of claim 13, wherein:
the axial wedge force of the input wedge component and the axial force of the input linear actuator together create a clamping force of the endless rotatable device on the movable sheave of the input pulley; and
the axial wedge force of the output wedge component and the axial force of the output linear actuator together create to a clamping force of the endless rotatable device on the movable sheave of the output pulley.

15. The powertrain of claim 13, wherein the actuator mechanism is electrically powered and is characterized by an absence of hydraulic actuation.

16. The powertrain of claim 15, wherein each of the input linear actuator and the output linear actuator comprises:

an electric motor;
a linearly movable screw operatively connected to the movable sheave; and
a gearing mechanism operatively connecting the electric motor to the linearly movable screw;
wherein the actuator mechanism further comprises an electronic controller operatively connected to the electric motor and responsive to powertrain operating conditions; and
wherein the electric motor is configured to be activated by the electronic controller in response to the powertrain operating conditions to move the linearly movable screw to apply the axial force on the respective movable sheave.

17. The powertrain of claim 13, further comprising:
an engine coupled to the input shaft and configured to drive the input shaft with torque in the drive direction; and
wherein the axial force applied by the input linear actuator is at least partially in response to the torque provided by the engine.

18. The powertrain of claim 17, wherein the actuator mechanism further comprises:
a hydraulic system;
an electric pump; and
an electronic controller operatively connected to the hydraulic system;
wherein the input linear actuator and the output linear actuator are configured to be activated independently of one another via fluid in the hydraulic system that is pressurized by the electric pump.

19. The powertrain of claim 17, wherein the actuator mechanism further comprises:
a hydraulic system;
a mechanical pump driven by the engine;
an accumulator pressurizable with fluid by the mechanical pump; and
an electronic controller operatively connected to the hydraulic system and to the engine;
wherein the input linear actuator and the output linear actuator are configured to be activated independently of one another by fluid in the hydraulic system that is pressurized by the mechanical pump when the engine is running; and
wherein the input linear actuator and the output linear actuator are configured to be activated by fluid in the hydraulic system that is released from the accumulator when the engine is not running during a hybrid start-stop mode.

* * * * *